United States Patent [19]
Kasuga

[11] Patent Number: 5,311,788
[45] Date of Patent: May 17, 1994

[54] LINEAR WORKING UNIT
[75] Inventor: Shinichi Kasuga, Gunma, Japan
[73] Assignee: NSK Ltd., Tokyo, Japan
[21] Appl. No.: 950,012
[22] Filed: Sep. 24, 1992
[30] Foreign Application Priority Data

| Sep. 25, 1991 | [JP] | Japan | 3-85339[U] |
| Oct. 21, 1991 | [JP] | Japan | 3-299530[U] |
| Oct. 24, 1991 | [JP] | Japan | 3-94968[U] |
| Dec. 4, 1991 | [JP] | Japan | 3-108172[U] |

[51] Int. Cl.$^5$ ............................................. F16H 25/22
[52] U.S. Cl. ........................ 74/89.15; 74/424.8 R.; 74/459; 269/242; 403/DIG. 1; 411/539; 411/546
[58] Field of Search ............... 74/424.8 R, 89.15, 459; 403/DIG. 1; 411/535, 546, 539; 464/180; 269/242

[56] References Cited
U.S. PATENT DOCUMENTS

| 72,921 | 12/1867 | Shellenbock | 269/242 |
| 1,008,926 | 11/1911 | Saylor | 269/242 X |
| 2,660,029 | 11/1953 | Geyer | 74/89.15 X |
| 3,192,783 | 7/1965 | Cruzan | 74/89.15 |
| 4,195,542 | 4/1980 | Zimmer | 403/DIG. 1 X |
| 4,671,127 | 6/1987 | Yamaguchi et al. | 74/89.15 |
| 4,953,418 | 9/1990 | Hirose | 74/89.15 X |

FOREIGN PATENT DOCUMENTS
63-193637 12/1988 Japan .

*Primary Examiner*—Allan D. Herrmann
*Attorney, Agent, or Firm*—Sughrue, Mion, Zinn, Macpeak & Seas

[57] ABSTRACT

In order to offer a linear working unit which is a linear working unit capable of accurately driving two movable members in mutually reverse directions, i.e., leftward and rightward, with a single driving means and yet formed in a construction highly accurate in performance but compact and moderately priced, according to the present invention, a left-hand thread part and a right-hand thread part are formed on a single feed screw, with a nut block being joined independently with each of the left-hand thread part and the right-hand thread part and with the respective nut blocks being installed on a guide rail, and rolling elements are set in the space between the rolling groove formed for the rolling elements in the guide rail and the rolling grooves formed in the nut blocks, so that the nut blocks are kept free to slide in the axial direction by the effect of the rolling motion of these rolling elements. Thereby, the linear working unit is capable of operating the two nut blocks so as to make their highly accurate movements in the mutually reverse directions, i.e., leftward and rightward, through control of a single feed screw and, as these nut blocks are built into the same guide rail, the linear working unit can offer the additional advantage that it can be formed in a non-bulky structure comprised of a smaller number of items of component parts and can yet be operated in a simple manner.

17 Claims, 15 Drawing Sheets

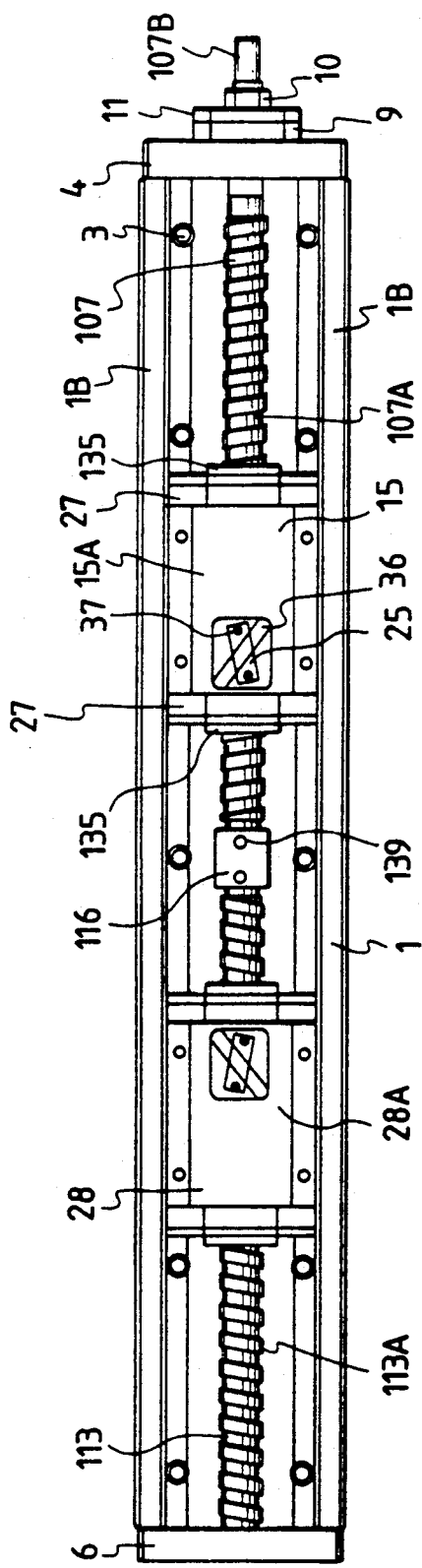
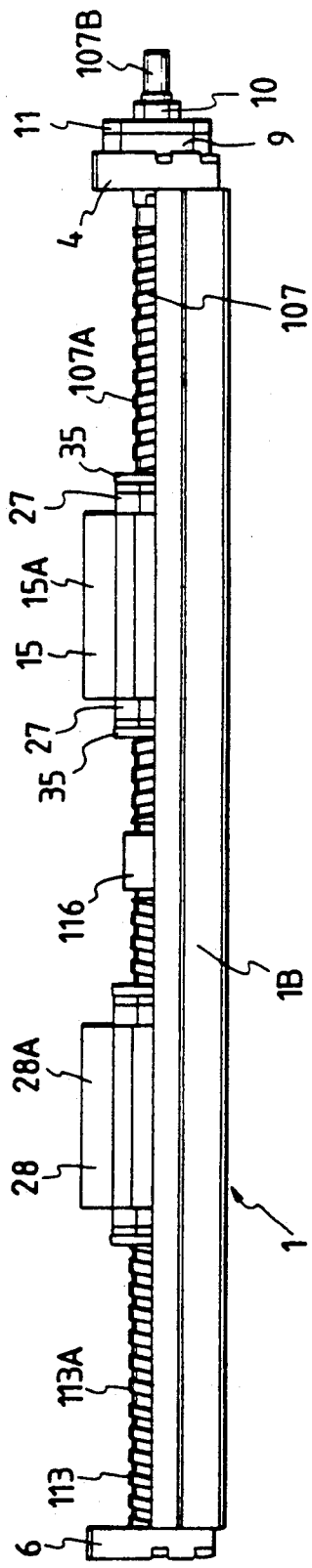
FIG. 18
FIG. 19

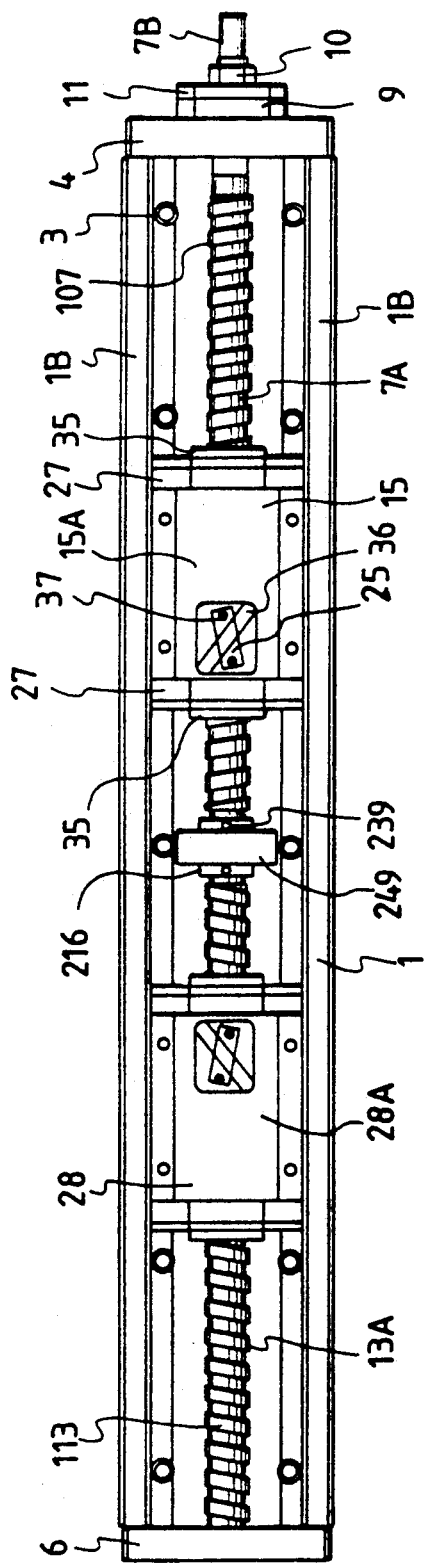
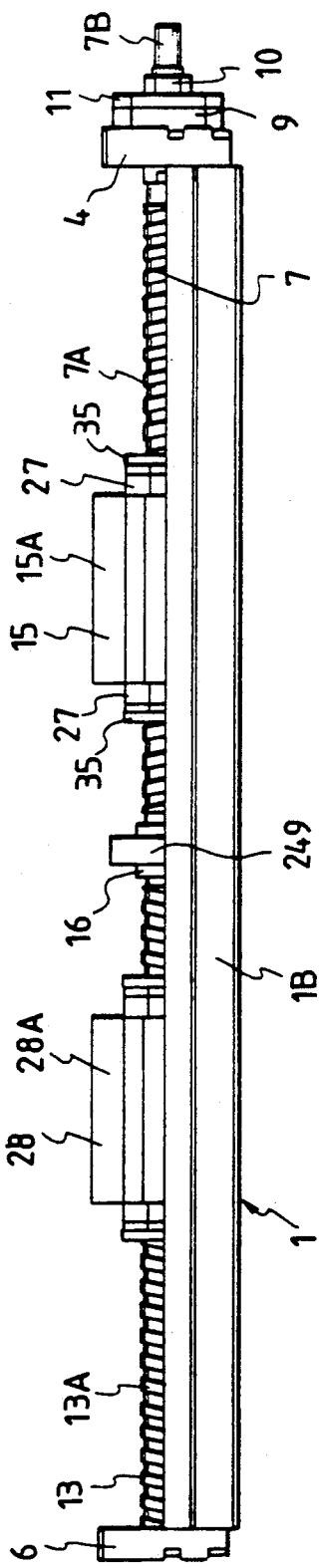
FIG. 24
FIG. 25

LINEAR WORKING UNIT

BACKGROUND OF THE INVENTION

The present invention relates to a linear working unit which is used in such apparatuses as a robot or a measuring instrument.

As regards a linear working unit which is constructed, for use as a working arm of a simple robot or in a measuring instrument or the like, in such a manner that a nut block, being guided by a guide rail, is moved in the axial direction along with the revolving motion of a screw shaft driven with a motor, such a linear working unit which is disclosed, for example, in the Unexamined Japanese Utility Model Publication No. 193,637/1988 is generally known.

It is required of a measuring instrument or the like that two movable members move leftward and rightward in relation to a reference line, but no such unit has hitherto been known among the conventional linear working units. If it is to be attempted to realize such an operation with the conventional linear working units, it is necessary to provide two such units in series in such a manner that a movable member in one of these units is moved in one axial direction while the movable member in the other unit is moved in the opposite direction each working in correspondence to the other in a predetermined relative relation to the movable member in the former unit. Yet, such an arrangement of the two conventional linear working units would present the problem that it would be difficult to attain any sufficient accuracy in the movement of the two movable members in the linear direction or to attain any sufficient synchronization of their leftward and rightward movements. Also, such an arrangement of the two conventional linear working units would present the additional problem that it would be difficult to secure any proper relation of the relative positions of the two movable members.

Further, such an arrangement of the two conventional linear working units would present the still additional problem that it would be difficult to maintain any accurate parallelism of the two moving members in the direction of their linear movement or to maintain their well-regulated positions, so that the two movable members would generate vibrations and noises when they are set into high-speed operation and that these movable members fail to attain any satisfactory stability when they are brought to a stop, and, above all, those units with a long stroke are liable to cause vibrations.

Furthermore, such linear working units would be liable to wastefulness in manufacturing processes because it would be necessary, for instance, to change the positions of mounting holes for the installation of a guide rail in case the two movable members are to be adjusted to a variety of positions as the user requires in relation to the guide rails. In addition, the use of such two units would present the problem that it necessarily makes it impossible to assemble the two units in any light-weight and compact construction, with the inevitable result that the assembled product would be formed of a larger number of items of component parts and would be expensive.

SUMMARY OF THE INVENTION

Thus, in view of the problems of the conventional linear working unit described in the example given above, it is an object of the present invention to offer a novel linear working unit which, being a linear working unit comprised of two movable members symmetrically driven leftward and rightward with a single driving means, is easy to operate, formed in a highly precise construction in a compact size, and yet made available at a moderate price.

Also, in view of the problems of the conventional linear working unit described in the example given above, it is another object of the present invention to offer a moderately priced novel linear working unit which, being a linear working unit comprised of two movable members symmetrically driven leftward and rightward with a single driving means, is easy to operate, formed in a highly precise construction in a compact size, and yet permits easy changes of the stroke positions in a variety of ways.

Further, in view of the problems of the conventional linear working unit described in the example given above, it is still another object of the present invention to offer a moderately priced novel linear working unit which, being a linear working unit comprised of two movable members symmetrically driven leftward and rightward with a single driving means, is easy to operate, formed in a highly precise construction in a compact size, and yet permits easy adjustments of the relative positions of the two movable members.

Furthermore, in view of the problems described above, it is still another object of the present invention to offer a moderately priced novel linear working unit which, being a linear working unit comprised of two movable members driven in adjusted positional relationship with a single driving means, is easy to operate, formed in a highly precise construction in a compact size, and is yet capable of significantly reducing the noises due to vibrations generated at the time of its operation at a high speed, even in case the unit has a long stroke, and attaining high stability of its movable members when they are stopped.

A linear working unit according to the first aspect of the present invention attains the above-mentioned object by its construction comprises:

a long-size guide rail having a rolling groove formed for rolling elements in the axial direction on each of the two mutually confronting sides thereof;

a feed screw having a left-hand thread part and a right-hand thread part on its outside surface, arranged in the axial direction of the guide rail, and supported in such a manner as to permit its free turning motion in relation to the guide rail;

a first nut block, which has a rolling groove for the motion of the rolling elements, this rolling groove being arranged in opposition to the rolling groove provided for the motion of the rolling elements in the guide rail, also has a return passage formed in the thicker wall area to permit the return motion of the rolling elements, and is joined by screw to the left-hand thread part of the feed screw in such a manner as to slide freely;

a second nut block, which has a rolling groove for the motion of the rolling elements, this rolling groove being arranged in opposition to the rolling groove provided for the motion of the rolling elements in the guide rail, also has a return passage formed in the thicker wall area to permit the return motion of the rolling elements, and is joined by screw to the right-hand thread part of the feed screw in such a manner as to slide freely;

a large number of rolling elements, which, being respectively set in such a manner as to roll freely through the space formed with the rolling groove for the rolling elements in the guide above and the rolling groove for the rolling elements in the first nut block positioned opposite to the rolling groove in the guide rail and the rolling groove for the rolling elements in the second nut block above, supports the first nut block and the second nut block in such a manner as to permit their respective free sliding movement in the axial direction in relation to the guide rail; and end caps each having a curved passage, which, being formed for the circulation of the rolling elements with a rolling groove for the rolling elements in the guide rail and with the rolling grooves formed for the rolling elements in the nut blocks in positions opposite to that of the rolling groove in the guide rail, forms an interconnection between the passage for the rolling elements in their rolling motion under a load applied by the nut blocks and a return passage for the rolling elements in the nut blocks.

A linear working unit according to the second aspect of the present invention attains the above-mentioned object by its construction comprises:

a long-size guide rail having a rolling groove formed for rolling elements in the axial direction on each of the two mutually confronting sides thereof;

a feed screw having a left-hand thread part and a right-hand thread part on its outside surface, arranged in the axial direction of the guide rail, and supported in such a manner as to permit its free turning motion in relation to the guide rail;

a spacing seat for adjusting the position of the feed screw in the axial direction in relation to the guide rail;

a first nut block, which has a rolling groove for the motion of the rolling elements, this rolling groove being arranged in opposition to rolling groove provided for the motion of the rolling elements in the guide rail, also has a return passage formed in the thicker wall area to permit the return motion of the rolling elements, and is joined by screw to the left-hand thread part of the feed screw in such a manner as to slide freely;

a second nut block, which has a rolling groove for the motion of the rolling elements, this rolling groove being arranged in opposition to the rolling groove provided for the motion of the rolling elements in the guide rail, also has a return passage formed in the thicker wall area to permit the return motion of the rolling elements, and is joined by screw to the right-hand thread part of the feed screw in such a manner as to slide freely;

a large number of rolling elements, which, being respectively set in such a manner as to roll freely through the space formed with the rolling groove for the rolling elements in the guide rail and the rolling groove for the rolling elements in the first nut block positioned opposite to the rolling groove in the guide rail and the rolling groove for the rolling elements in the second nut block, supports the first nut block and the second nut block in such a manner as to permit their respective free sliding movement in the axial direction in relation to the guide rail; and end caps each having a curved passage which, being formed for the circulation of the rolling elements with a rolling groove for the rolling elements in the guide rail and with the rolling grooves formed for the rolling elements in the nut blocks in positions opposite to that of the rolling groove in the guide rail, forms an interconnection between the passage for the rolling elements in their rolling motion under a load applied by the nut blocks and a return passage for the rolling elements in the nut blocks.

A linear working unit according to the third aspect of the present invention attains the above-mentioned object by its construction comprises:

a long-size guide rail having a rolling groove formed for rolling elements in the axial direction on each of two mutually confronting sides thereof;

a first screw shaft having a right-hand thread part on its outer circumferential surface, arranged in the axial direction of the guide rail, and axially fixed in such a manner as to be capable of turning freely in relation to the guide rail;

a second screw shaft sharing the same shaft core with the first screw shaft, arranged in the direction of the shaft core, and having a left-hand thread part on its rolling elements;

a coupling which rigidly connects the first screw shaft with the second screw shaft in a position as determined by adjusting the phase of the ball screw groove in the thread part of the second screw shaft in relation to the first screw shaft;

a first nut block, which has a rolling groove formed for the motion of the rolling elements and arranged in opposition to the rolling groove provided for the motion of the rolling elements in the guide rail, also has a return passage formed in the thicker wall area to permit the return motion of the rolling elements, and is joined by screw to the first screw shaft in such a manner as to slide freely;

a second nut block, which has a rolling groove formed for the motion of the rolling elements and arranged in opposition to the rolling groove provided for the motion of the rolling elements in the guide rail and also has a return passage formed in the thicker wall area to permit the return motion of the rolling elements, and is joined by screw to the second screw shaft in such a manner as to slide freely;

a large number of rolling elements, which, being respectively set in such a manner as to roll freely through the space formed with the rolling groove for the rolling elements in the guide rail and the rolling groove for the rolling elements in the first nut block positioned opposite to the rolling groove in the guide rail and the rolling groove for the rolling elements in the second nut block, supports the first nut block and the second nut block in such a manner as to permit their respective free sliding movement in the axial direction in relation to the guide rail; and end caps each having a curved passage which is formed for the circulation of the rolling elements with a rolling groove for the rolling elements in the guide rail and with the rolling grooves formed for the rolling elements in the nut blocks in positions opposite to that of the rolling groove in the guide rail and forms an interconnection between the passage for the rolling elements in their rolling motion under a load applied by the nut blocks and a return passage for the rolling elements in the nut blocks.

A linear working unit according to the fourth aspect of the present invention attains the above-mentioned object by its construction comprises:

a long-size guide rail having a rolling groove formed for rolling elements in the axial direction on each of two mutually confronting sides thereof;

a screw shaft arranged in the axial direction of the guide rail and axially supported in such a manner as to rotate freely in relation to the guide rail;

a vibration control means having a member capable of performing its relative motion in relation to the screw shaft and rigidly mounted on the screw shaft;

a first nut block, which has a rolling groove formed for the motion of the rolling elements and arranged in opposition to the rolling groove provided for the motion of the rolling elements in the guide rail, also has a return passage formed in the thicker wall area to permit the return motion of the rolling elements, and is joined by screw to the screw shaft in such a manner as to slide freely;

a second nut block, which has a rolling groove formed for the motion of the rolling elements and arranged in opposition to the rolling groove provided for the motion of the rolling elements in the guide rail, also has a return passage formed in the thicker wall area to permit the return motion of the rolling elements, and is joined by screw to the screw shaft in such a manner as to slide freely;

a large number of rolling elements, which, being respectively set in such a manner as to roll freely through the space formed with the rolling groove for the rolling elements in the guide rail and the rolling groove for the rolling elements in the first nut block positioned opposite to the rolling groove in the guide rail and the rolling groove for the rolling elements in the second nut block, supports the first nut block and the second nut block in such a manner as to permit their respective free sliding movement in the axial direction in relation to the guide rail; and an end cap having a curved passage which, being formed for the circulation of the rolling elements with a rolling groove formed for the rolling elements in the guide rail and with the rolling grooves formed for the rolling elements in the nut blocks in positions opposite to that of the rolling groove in the guide rail, forms an interconnection between the passage for the rolling elements in their rolling motion under a load applied by the nut blocks and a return passage for the rolling elements in the nut blocks.

A linear working unit according to the first aspect of the present invention comprises a left-hand thread part and a right-hand thread part formed on a single feed screw, with nut blocks independently set in engagement by screw with this left-hand thread part and this right-hand thread part, respectively, and also provided with rolling elements arranged between a rolling groove formed for the rolling elements in the guide rail and a rolling groove formed for the rolling elements in each of these nut blocks, the nut blocks being thereby held in such a manner as to be enabled to perform their respective sliding motion in the axial direction by the effect of the rolling motion of these rolling elements and the two nut blocks therefore moving leftward and rightward in mutually opposite directions by the effect of the rotating motion of the feed screw. Moreover, these nut blocks move as guided by the same rolling grooves formed for the rolling elements in the guide rail, and the parallelism of these nut blocks in the respective moving directions can therefore be secured. In addition, as these nut blocks are built into the same guide rail, the construction of this linear working unit can be formed in a less bulky structure comprised of a smaller number of component parts.

A linear working unit according to the second aspect of the present invention comprises a single feed screw arranged in a position as adjusted with a spacing seat in the axial direction in relation to the guide rail, with a left-hand thread part and a right-hand thread part being formed on the single feed screw and with nut blocks independently set in engagement by screw with this left-hand thread part and this right-hand thread part, respectively, and also with rolling elements being arranged between a rolling groove formed for the rolling elements in the guide rail and a rolling groove formed for the rolling elements in each of these nut blocks, the nut blocks being thereby held in such a manner as to be enabled to perform their respective sliding motion in the axial direction by the effect of the rolling motion of these rolling elements, and, as a spacing seat formed in a predetermined thickness is interposed between the feed screw side and the guide rail side, it is possible to change the position of the feed screw in relation to the guide rail by varying the thickness of the spacing seat. This construction forms a linear working unit which is capable of moving the two nut blocks in mutually opposite directions, namely, leftward and rightward, in their desired positional relationship with the turning motion of the feed screw, and, as the nut blocks move, being guided by the rolling groove formed for the rolling elements by continual processing thereof in the axial direction of the guide rail, this linear working unit can secure the parallelism of the two nut blocks in their working direction. In addition, these nut blocks are built into the same guide rail, and the construction of this linear working unit can be formed in a less bulky structure comprised of a smaller number of component parts.

A linear working unit according to the third aspect of the present invention comprises a first screw shaft having a right-hand thread part and a second screw shaft having a left-hand thread part, these two screw shafts being rigidly connected with a coupling in a position as determined by adjusting the relative position (phase) of the ball screw groove in of the second screw shaft, with nut blocks being independently set in engagement by screw with the right-hand thread part of the first screw shaft and the left-hand thread part of the second screw shaft, respectively, and also provided with rolling elements arranged between a rolling groove formed for the rolling elements in the guide rail and a rolling groove formed for the rolling elements in each of these nut blocks, and, now that the nut blocks being thereby held in such a manner as to be enabled to perform their respective sliding motion in the axial direction by the effect of the rolling motion of these rolling elements, it is possible to form a linear working unit in which the two nut blocks will move in mutually opposite directions, namely, leftward and rightward, in the adjusted relative positional relationship by the effect of the rotating motion of the first screw shaft, and the phase of the two screw shafts will be changed by rigidly holding the second screw shaft with the coupling at a point where the second screw is positioned when it is rotated by a predetermined amount in the circumferential direction in relation to the first screw shaft. Further, now that these nut blocks will move as guided by the rolling grooves formed for the rolling elements in the axial direction of the guide rail in the guide rail, the parallelism of these two nut blocks in the respective moving directions can be secured. In addition, as these nut blocks are built into the same guide rail, the construction of this linear working unit can be formed in a less bulky structure comprised of a smaller number of component parts.

A linear working unit according to the fourth aspect of the present invention comprises a vibration control means having a member capable of performing its relative motion in relation to the screw shaft, a vibration control means installed on the screw shaft, two nut blocks independently joined by screws on the screw shaft, and rolling elements set between a rolling groove formed for the rolling elements in the guide rail and a rolling groove formed for the rolling elements in each of these nut blocks, the nut blocks being thereby held in such a manner as to be enabled to perform their respective sliding motion in the axial direction by the effect of the rolling motion of these rolling elements, so that the construction thus formed realizes a linear working unit in which the two nut blocks will move in an adjusted relative positional relation when the screw shaft is turned, and, now that the screw shaft is subjected to the force of inertia exerted by the vibration control means, the screw shaft receives the force of inertia in the direction at right angles with the shaft core of the screw shaft, in the axial direction, in the direction of its rotation, and so forth, so that this mechanism can prevent the screw shaft from its abrupt displacement and can thereby achieve a reduction of the vibrations of the screw shaft. Further, as the body thus applying the force of inertia is not fixed on the screw shaft and since the vibrations of the body thus applying the force of inertia is different from the vibrations of the screw shaft in respect of a high rate of acceleration, this mechanism is capable of canceling the vibrations of the shaft in case any collision occurs between the screw shaft and the body applying the force of inertia. In a construction formed with a viscous matter interposed between the body applying the force of inertia and the screw shaft, resistance working for preventing the vibrations of the screw shaft can be derived from the viscosity of the viscous matter, in addition to the effect of the force of inertia, and the vibrations of the screw shaft can be reduced thereby. Moreover, these nut blocks move as guided by the rolling grooves formed for the rolling elements in the axial direction of the guide rail, and the parallelism of these nut blocks in the respective moving directions can therefore be secured. In addition, as these nut blocks are built into the same guide rail, the construction of this linear working unit can be formed in a less bulky structure comprised of a smaller number of component parts.

BRIEF DESCRIPTION OF THE DRAWINGS

The manner by which the above objects, features and advantages of the present invention are attained will be fully evident from the following detailed description when it is considered in light of the drawings, wherein:

FIG. 18 is a plane view illustrating a second example of preferred e of the present invention;

FIG. 19 is a front view of the construction of the second example of preferred embodiment illustrated in FIG. 18;

FIG. 24 is a plane view illustrating a third example of preferred embodiment of the present invention;

FIG. 25 is a front view of the construction shown in FIG. 24;

DETAILED DESCRIPTION OF THE INVENTION

First Example of Preferred Embodiment

Now, a first example of preferred embodiment of the present invention will be described in detail with reference to the accompanying drawings, in which like reference marks designate like or corresponding parts throughout the several drawings.

In the description to follow, some embodiments of the present invention will be used as examples. It should be noted, however, that the present invention is not limited in any way to these examples of its embodiment, but may be applied effectively to other forms of its embodiment to such an extent as will not deviate from the technical scope defined herein for the present invention.

Figure 1:
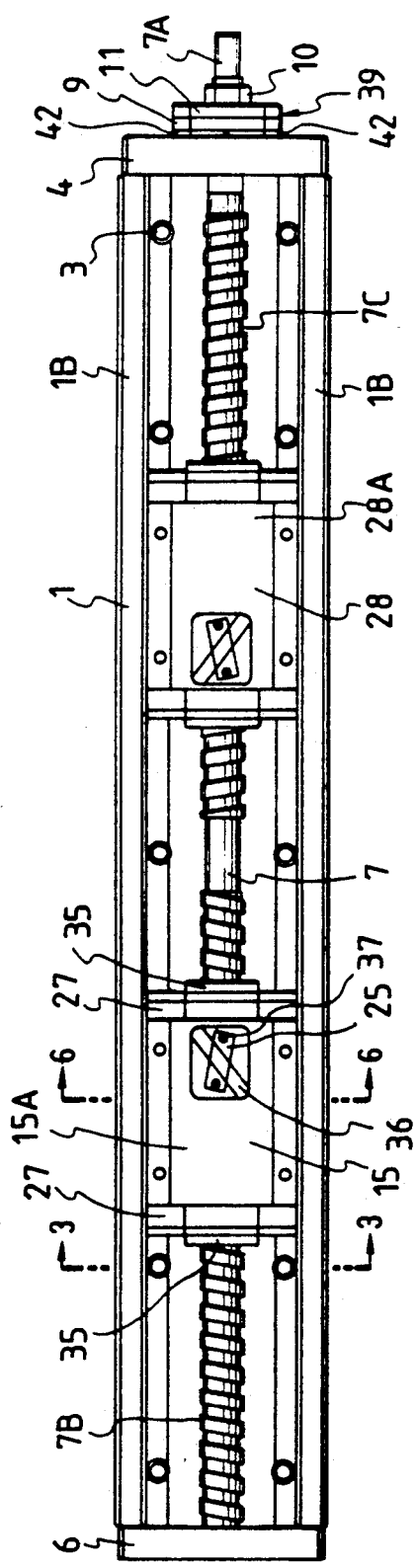
FIG. 1 is a plane view illustrating a first example of preferred embodiment of the present invention.
Figure 2:
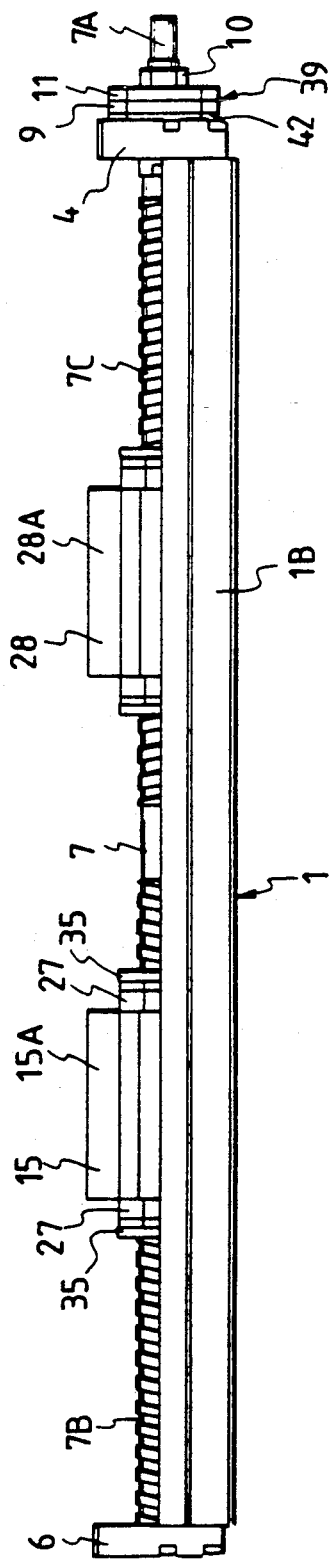
FIG. 2 is a front view of the construction in embodiment of the present invention as shown in FIG. 1.
Figure 3:
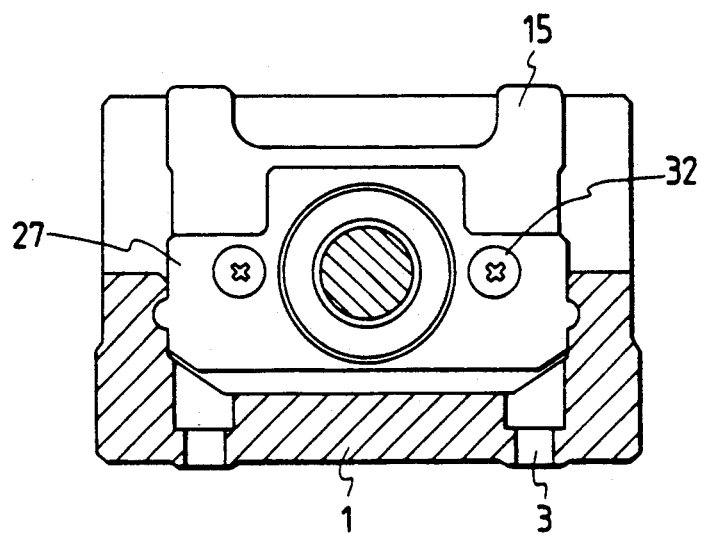
FIG. 3 is a sectional view of the same construction as taken along the line 3—3 shown in FIG. 1.
Figure 4:
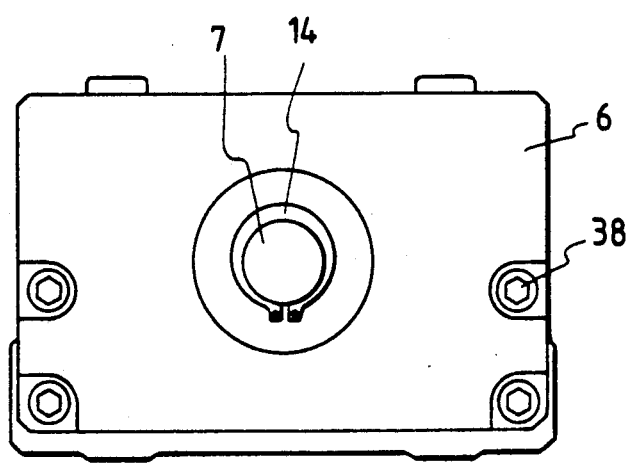
FIG. 4 is a left side view of the construction shown in FIG. 2.
Figure 6:
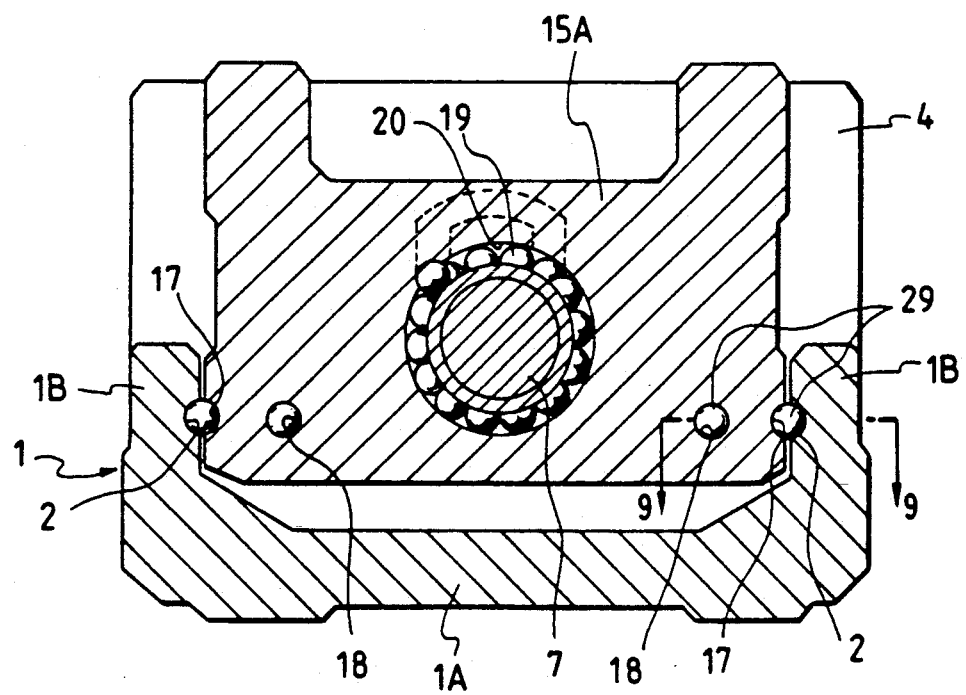
FIG. 6 is a sectional view of the same construction as taken along the line 6—6 shown in FIG. 1.

Now, a guide rail 1, which is a rail member in a long length as shown in FIG. 1, is formed in a rectangular cross section with one side thereof open and has ball rolling grooves 2, each of which is a single rolling groove provided for the movement of rolling elements and extending in the axial direction, and these ball rolling grooves 2 are formed in their mutually confronting arrangement on the inner surfaces of the two side wall parts 1B and 1B extending upward from both ends of the bottom area 1A of the rail member (Refer to FIG. 6). Then, bolt holes 3 for bolts for use in the installation of the guide rail are formed in the state of being set apart at predetermined intervals in the axial direction in the bottom area 1A in a position in the proximity of the two side wall parts 1B. A shaft supporting plate 4 is mounted as tightened with threaded bolts 5 onto one end part of this guide rail 1 in the longitudinal direction, and a shaft supporting plate 6 is mounted as tightened with threaded bolts 38 on the other end part of the guide rail 1.

A feed screw 7, which is arranged in the longitudinal direction of the guide rail 1, is set in parallel with the ball rolling grooves 2 and 2, which are provided in the two side wall parts 1B and 1B of the guide rail, and is arranged in a position intermediate between the two side wall parts 1B and 1B. One end of the feed screw 7 is inserted into ball bearings 40, which are built into a housing 9 for a support unit installed by the use of a bolt 8 on the shaft supporting plate 4 and supported by way of a spacer 41 in such a manner as to be prohibited by a lock nut from its movement in the axial direction and to be enabled to turn freely. A clamping cover 11, which is used to fix the outer ring side of the ball bearings, is fixed with a bolt 12 on the outer end surface of a housing 9. The other end part of the feed screw 7 is inserted into ball bearings set in the shaft supporting plate 6 and used for supporting an end part of the shaft, and, with a stop ring 14 set in engagement with the shaft end, the ball bearings for supporting the shaft end are prevented from falling off, and an end part of the feed screw 7 is supported in this state. A left-hand thread part and a right-hand thread part are formed in approximately equal lengths extending to points close to the central part in the portion of the feed screw 7 between the shaft supporting plate 4 set at one end part of the guide rail 1 and the shaft supporting plate 6 set at the other end part of the same guide rail 1. The thread parts of the feed screw 7 are formed in such a manner that the left-hand thread part 7B is set up at the side closer to the shaft supporting plate 6 while the right-hand thread part 7C is set up at the side closer to the shaft supporting plate 4. A shaft end part 7A of the feed screw 7 is the part of the shaft on which a rotating joint is to be installed, and, by this rotating joint, the part of the shaft is connected with a driving motor, which turns the screw shaft 7.

The lower side part of a first nut block 15 is inserted in the guide rail 1 formed in a U-shape (i.e., in a square shape open at one side), and a ball rolling groove 17 is formed in a position opposite to the ball rolling groove 2 formed in the guide rail. A ball return passage 18 is formed as a through hole in the axial direction in the thicker wall portion of the first nut block 15 in correspondence with the ball rolling groove 17.

Figure 7:
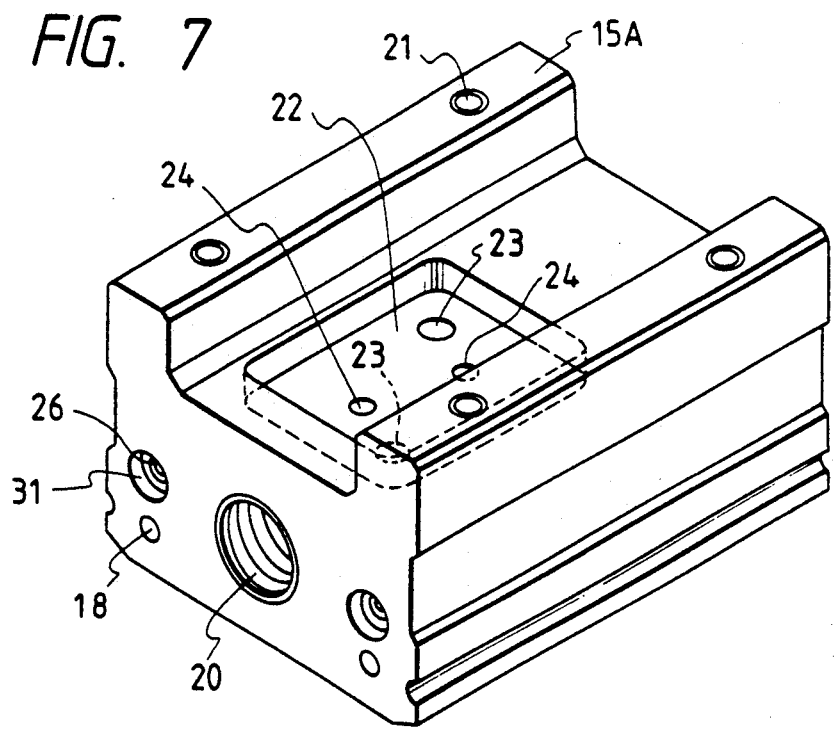
FIG. 7 is a perspective view of the components parts shown in FIG. 1.
Figure 8:
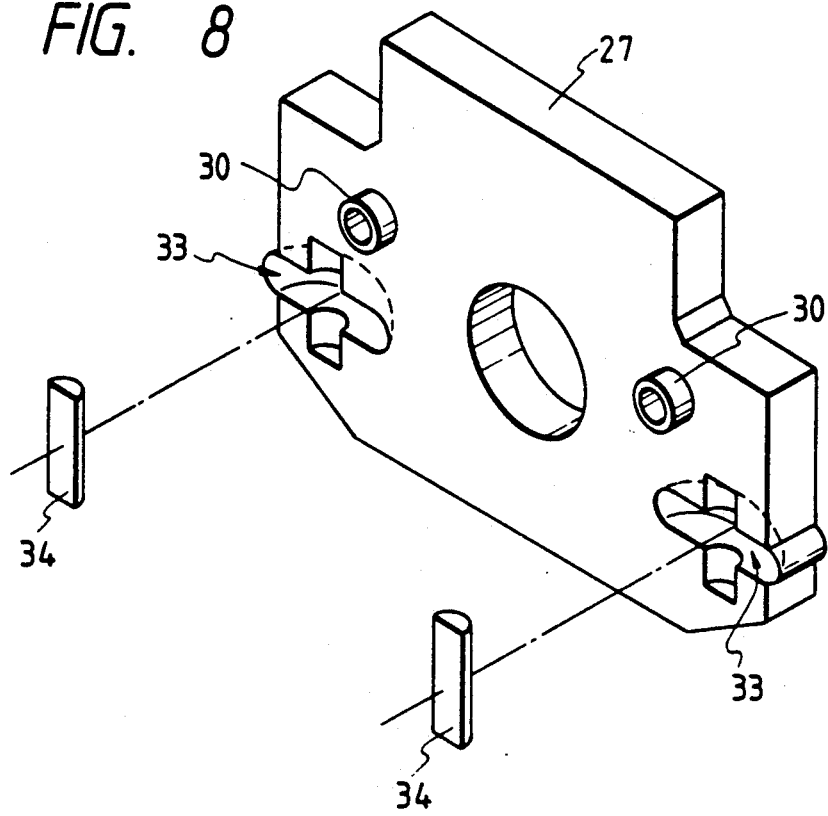
FIG. 8 is also a perspective view of the component parts shown in FIG. 1.
Figure 9:
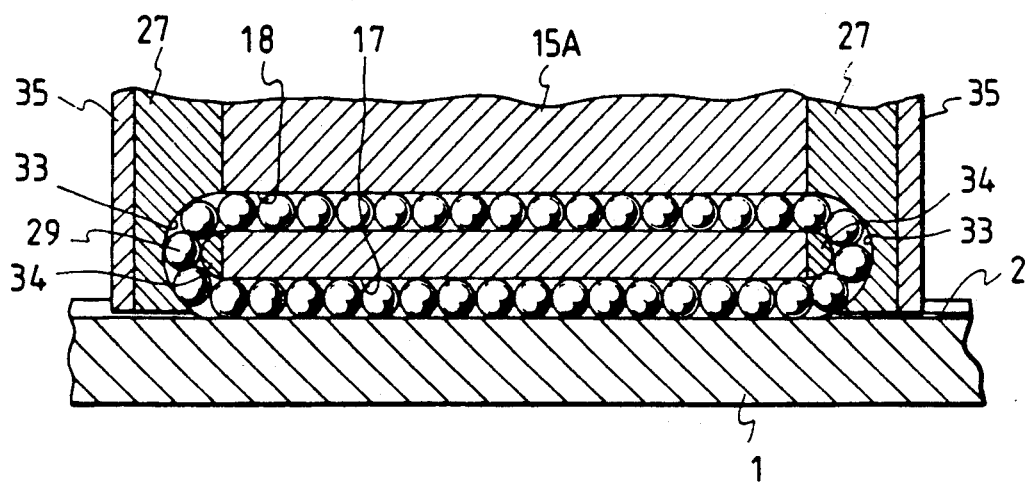
FIG. 9 is a view of the same construction as taken along the line 9—9 shown in FIG. 6.

The main unit 15A of the first nut block has a screw part 20 with left-hand thread formed thereon, the screw part 20 being helically fitted into the left-hand thread part 7B of the feed screw, with balls 19, which are rolling elements, being interposed between them. The two side parts of the upper surface of this main unit 15A of the nut block extend upward, and the upper surface of this main unit 15A has screw holes 21 formed therein (Refer to FIG. 7) by which the user can fix such component parts as a table for use when the linear working unit is to be put into operation.

This main unit 15A of the nut block has a concave area 22 formed in the central area of its upper surface, and a hole 23 into which a ball circulating tube is to be inserted is made in the bottom area of the concave area 22. A ball circulating tube 36 formed in a U-shape is inserted into this hole 23, and this U-shaped ball circulating tube 36 forms a passage for the circulation of the balls 19. This ball circulating tube 36 is rigidly secured via a metal fitting 25 by bolts 37 helically fitted into screw holes 24 formed in the main unit 15A of the first nut block.

The screw holes 26 which are made in the end area of the main unit 15A of the first nut block are for use in the installation of an end cap 27, which will be described later. A second nut block 28 has a construction identical with that of the first nut block 15, except for the point that the second nut block 28 has a right-hand thread formed on the screw part helically joined with the screw part 7C of the feed screw with balls set between them, and a description of the second nut block 28, which would be a duplication, is omitted here.

The end cap 27 has its position set by fitting projections 30 respectively formed in the shape of cylindrical projections from the end surface of the end cap with fitting holes 31 formed by spot facing applied to form a larger diameter in the inlet parts of screw holes 26 provided in respective two end areas of the main unit 15A of the first nut block and the main unit 28a of the second nut block, and a side seal 35 is set in a state of its direct contact with the outer side of this end cap 27, and thus the end cap 27 is fixed with screws 32 via this side seal 35. This side seal 35 is thus provided in order to prevent the dust deposited in the ball rolling groove 2 of the guide rail or on the screw parts 7A and 13A of the screw shaft from intruding into the inside of the ball rolling area. On the joint end surface of the end cap 27, by which the end cap 27 is kept in its direct contact with the main unit 15A of the first nut block and with the main unit 28A of the second nut block, a ball circulating curved passage 33 is formed to provide intercommunications between a rolling element passage through which the rolling elements move by rolling under a load formed by the ball rolling groove 2 in the guide rail and the ball rolling groove 17 formed, in a position opposite to that of the ball rolling groove 2, in each of the first nut block and the second nut block and respective ball return passages in the first nut block and the second nut block. The ball circulating curved passage 33 is a passage formed in the shape of a halved doughnut by setting a return guide 34 in the end cap 27.

A large number of balls 29 are set in such a manner as to permit their free rolling motion in the space between ball rolling grooves 17, each of which is formed in the first nut block and in the second nut block, and the ball rolling groove 2 formed in the guide rail.

The linear working unit according to the present invention is driven for its operation by driving the motor for its revolutions, with the shaft end part 7A of the feed screw and the output shaft of the motor connected with each other by means of a rotating joint.

The side seal 35 is provided with an annular projection made of rubber material, which absorbs the impact resulting from a collision of the first nut block 15 and/or the second nut block 28 into the shaft supporting plate 6 and/or the shaft supporting plate 4 because of any such troubles as the revolution of the motor beyond operating control and the impact resulting from a mutual collision between the first nut block 15 and the second nut block 28. Thus, this projection functions as a cushion.

The first nut block 15 is helically joined with the left-hand thread part 7B of the feed screw 7, and the second nut block 28 is helically joined with the right-hand thread part 7C of the feed screw 7. Therefore, when the feed screw 7 is turned clockwise, the first nut block 15 and the second nut block 28 will move in the directions in which they move away from each other. In this regard, the balls 29 are set, in such a manner as to be able to move freely by their rolling, in the space between the ball rolling grooves 17 formed in the nut blocks and the ball rolling groove 2 formed in the guide rail, and the nut blocks are supported by the effect of the rolling motion of the balls 29. This feature makes it possible to reduce the frictional resistance of the nut blocks and consequently makes it possible to use a motor in a smaller capacity.

Along with the movement of the nut blocks, the balls 29 will move by their rolling motion, and the balls 29 will be circulated thereby in the circulating passage comprised of the curved passage 33 and the return passage 18 respectively formed in the end cap. The balls 19 are set in the gap between the screw parts of the nut blocks and the screw part of the feed screw, these together forming a ball screw block, so that the revolution of the screw shaft will set the balls 19 into their movement by rolling through the space between the screw part of the screw shaft and the screw parts of the nut blocks along with the movement of the nut blocks, and those balls which are pushed out into the ball circulating tube will circulate through the ball circulating tube.

Moreover, when the feed screw 7 is turned in the counterclockwise direction, which is in reverse to the direction of the above-mentioned turning operation of the feed screw 7, a movement reverse to what is mentioned above will be performed, by which the first nut block 15 and the second nut block 28 will respectively move in the directions in which these nut blocks 15 and 28 approach each other. The pitch of the left-hand thread part and that of the right-hand thread part of the linear working unit according to the present invention are made equal, and the respective nut blocks are formed in the same dimensions. Therefore, the movements of the respective nut blocks will be different in direction but equal in speed when the feed screw is turned, and the nut blocks are equal in weight. These operating features offer the advantage that the vibrations of the nut blocks at the time of their stopping will offset each other, so that it is thereby made possible to finish the positioning of the nut blocks in a short period of time.

The ball rolling groove 2, which is comprised of the ball rolling groove part provided in the guide rail for guiding the first nut block 15 and the ball rolling groove part provided in the guide rail for guiding the second nut block 28, is a groove formed of the same set of work executed over the entire length in the process for forming the groove, and the ball rolling groove 2 is thereby made with high precision in terms of such factors as its vertical orientation and parallelism, and it is therefore free from the occurrence of a deviation of the shaft core in the movement of the respective nut blocks, so that the moving accuracy of the two nut blocks can be secured.

This linear working unit is constructed in such a manner that the distance between the first nut block 15 and the shaft supporting plate 6 and the distance between the second nut block 28 and the shaft supporting plate 4 is kept equal, so that the second nut block will collide with the shaft supporting plate 4 at the same time as the first nut block collides with the shaft supporting plate 6 in case such a trouble as the revolution of the motor out of control should occur, and this construction can prevent any excessive force from being applied to any single point on the feed screw and can therefore reduce the damages which could otherwise be inflicted on the screw shaft.

Figure 10:
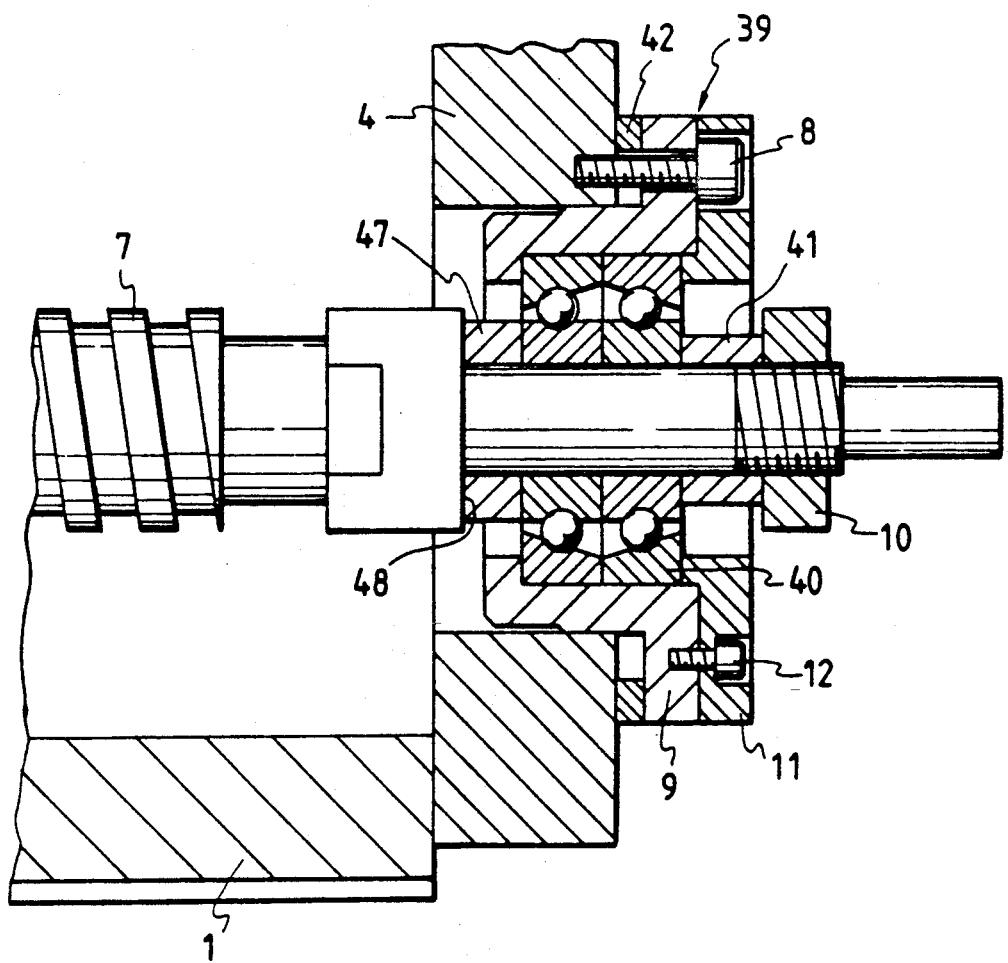
FIG. 10 is a vertical sectional view of a part of the construction shown in FIG. 1.
Figure 12:
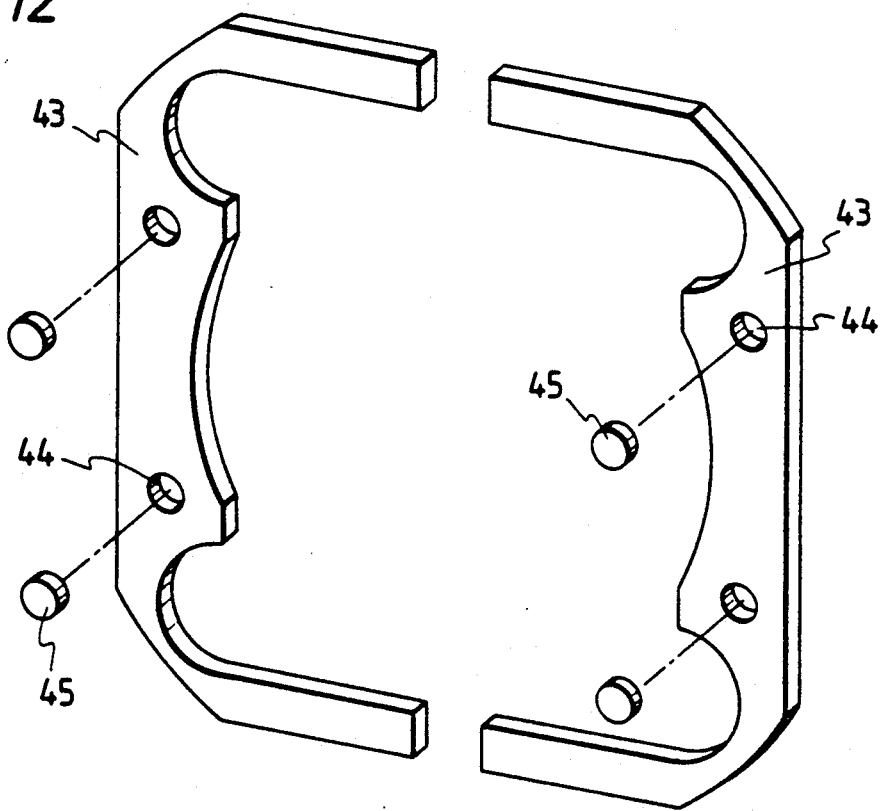
FIG. 12 is a perspective view showing an example of modified component parts for the first example of preferred embodiment.
Figure 13:
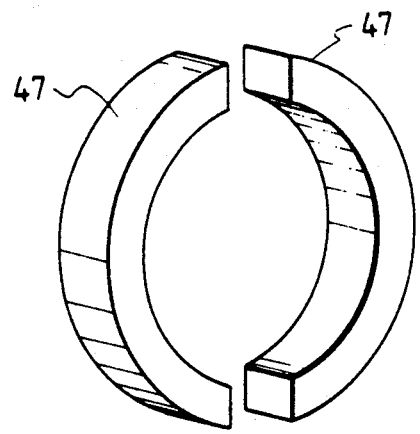
FIG. 13 is a perspective view illustrating the component parts for the first example of preferred embodiment.
Figure 14:
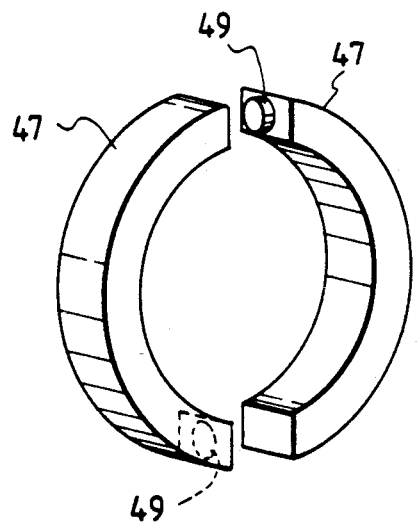
FIG. 14 is a perspective view showing a modified example of the component parts for the first example of preferred embodiment.
Figure 15:
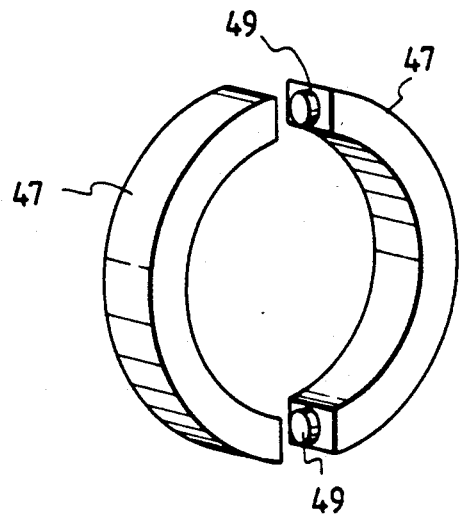
FIG. 15 is a perspective view illustrating a modified example of the component parts for the first example of preferred embodiment.

Two spacing seats 42 equal in thickness having a concave area 50, which is formed in an approximately U-shape with notches formed in the corners thereof between the housing 9 of the support unit and the shaft supporting plate 4, and having a part thereof bored for accepting a bolt inserted into it are provided in such a manner that the two spacing seats 42 are positioned opposite to each other and tightened with the bolt 8 in the state in which the outer circumferential parts of these spacing seats are fitted to the outer circumferential part of the support unit. Moreover, between the staged part 48 of the feed screw, which is inserted into the ball bearing 40, and the ball bearing 40, half-ring-shaped spacing seats 47, and 47 each having a square-shaped section perpendicular to the direction of its circumference and equal in thickness, are secured with the lock nut 10 by way of bearings in such a state that they confront each other as set in the circumference of the screw shaft 7 (Refer to FIG. 10). Now that the linear working unit is constructed in the manner described above, it is possible to make highly precise adjustments of the relative positions of the two nut blocks, as viewed in relation to the guide rail 1, to the various positions in conformity with the user's requirement by adjusting the thickness of the spacing seat 42 or that of the half-ring-shaped spacing seat 47. After the linear working unit is assembled in such a manner as to attain the relative positions of the first nut block 15 and the second nut block 28 in relation to the guide rail 1, the thickness of the spacing seat 42 can be increased in case the relative reference positions of the nut blocks are in deviation from the predetermined values, i.e., in case their relative reference positions are deviated so as to be closer to the shaft supporting plate 6. On the contrary, the thickness of the spacing seat 42 can be reduced in case the relative reference positions are deviated so as to be closer to the shaft supporting plate 4. Such adjustments of the spacing seat are to be made by detaching the spacing seat 42 and grinding the spacing seat 42 to reduce its thickness by the amount of the deviation of the relative reference positions of the two nut blocks from the desired positions or by replacing the spacing seat 42 with another spacing seat in a prescribed thickness. Also, it is possible to make an adjustment so as to move the entire nut block away from the motor side by the increment attained by increasing the length of the half-ring-shaped spacing seat 47 and to make an adjustment so as to move the entire nut block closer to the motor side by the decrement attained by decreasing the length of the half-ring-shaped spacing seat 47. The adjustments of the nut blocks may be made either by adjusting one of the spacing seat 42 and the half-ring-shaped spacing seat 47, or by adjusting both of these spacing seats. In such a case, the spacing seat 42 can be easily attached and detached by loosening the bolt 8 a little since the spacing seat 42 and the spacing seat 47 are not any solid structure, but formed in two divided parts, so that either of these spacing seats can be inserted from a side. The spacing seat 47, too, can be attached or detached easily because it is formed in two divided parts. With regard to the spacing seat 42, moreover, it is desirable to install the spacing seat in its position by using a magnet member 45, which is slightly smaller in diameter than that of the through hole 44, as set in the through hole 44 when a spacing seat 43, which is formed by making a through hole 44 in the spacing seat 42, is to be installed so as held between the mounting plate 4 and the housing 9 of the support unit, as shown in FIG. 12. This manner of installation will attain a state in which the spacing seat 43 will not fall off, even if the bolt 8 is in a loosened state, because the magnet member 45 is attracted by its magnetic force to the shaft supporting plate 4 or to the housing 9 of the support unit. Therefore, this manner of installation makes it possible to install the spacing seat with ease because the spacing seat will not deviate or fall out from its proper position even if one of the hands is held off when the bolt 8 is to be tightened after a spacing seat 43 is fitted by both hands to the outer circumference of the housing 9 of the support unit. In the case of this example, the spacing seat may be made of non-magnetic substance. Moreover, in case the spacing seat is made of any magnetic substance, it will be feasible to magnetize the spacing seat itself and thereby to prevent the spacing seat from deviating or falling off from its proper position. Additionally, it will be possible to install a spacing seat with ease by preventing it from falling off in the course of its installation by fixing a magnet member 47 on the end surface at one side in the direction of the circumference of the spacing seat, as shown in FIG. 14, in the case of the spacing seat 47, the spacing seat 47 and by fixing a magnet member 49 on both of the end surfaces in the direction of the circumference of one of the spacing seats, as shown in FIG. 15. In addition, it is feasible to have the spacing seat attracted to the staged part 48 of the feed screw with a magnet member set by adhesion or fitting under pressure to a concave area formed on the end surface in the axial direction of the half-ring-shaped spacing seat 47.

Figure 5:
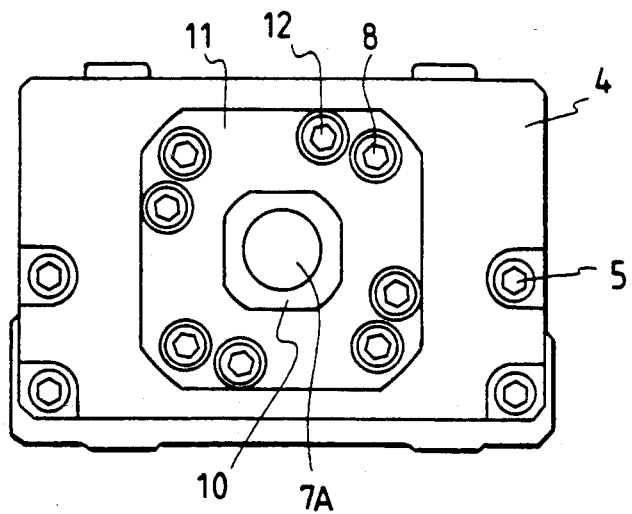
FIG. 5 is a right side view of the construction shown in FIG. 2.
Figure 11:
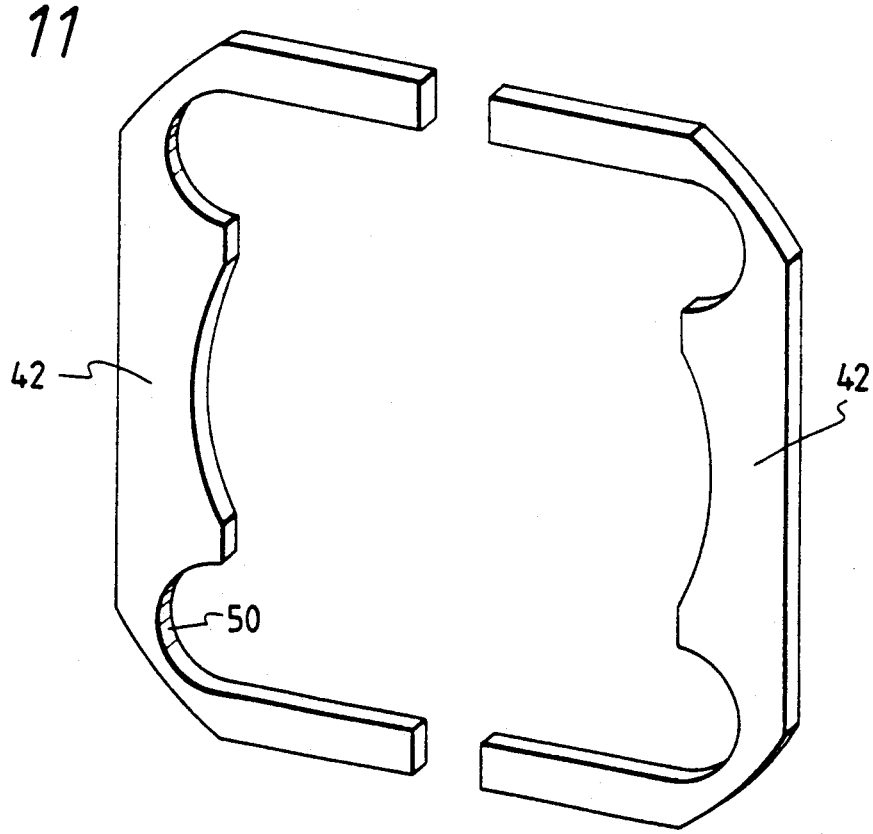
FIG. 11 is a perspective view of the component parts for the first example of preferred embodiment.
Figure 16:
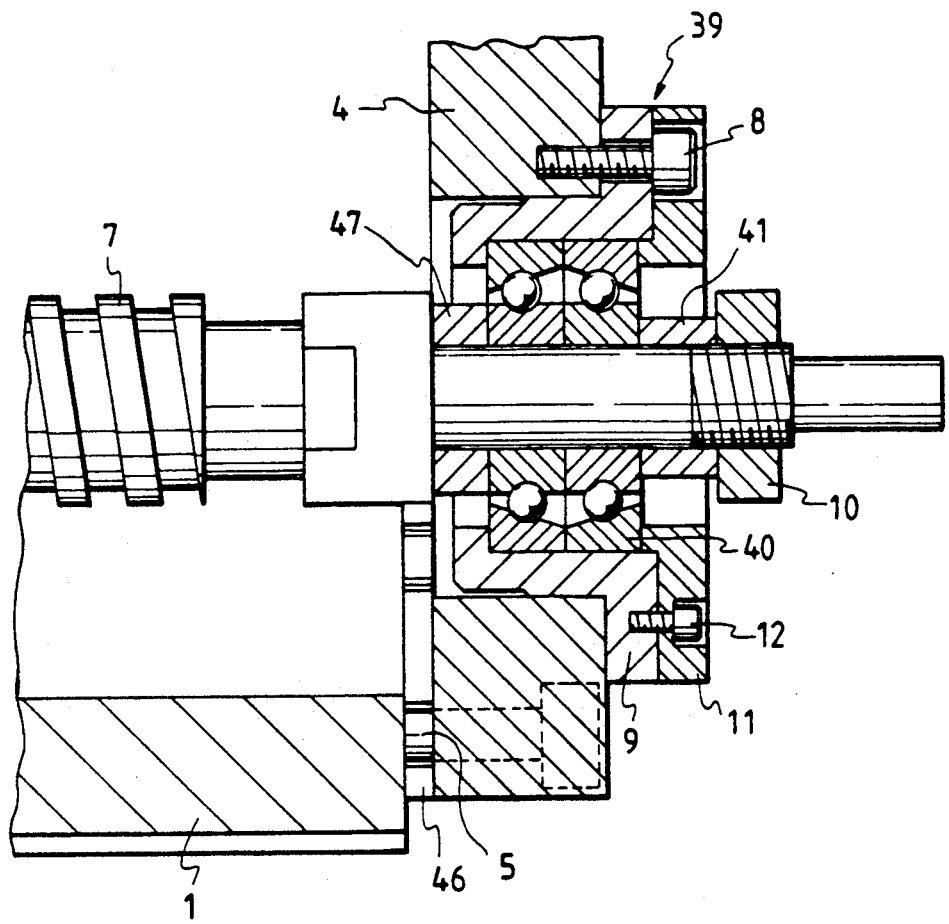
FIG. 16 is a vertical sectional view showing a part of the modified construction of the first example of preferred embodiment of the present invention.
Figure 17:
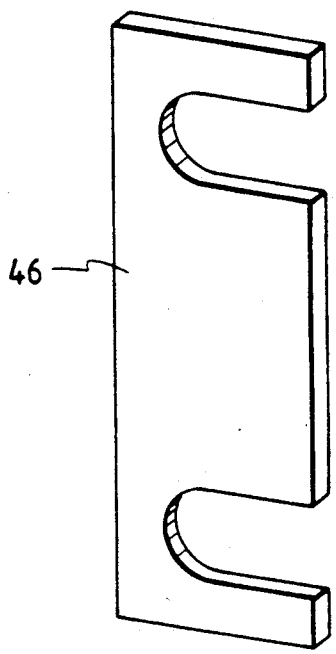
FIG. 17 is a perspective view of the component parts for a modified example of the first example of preferred embodiment.
Figure 20:
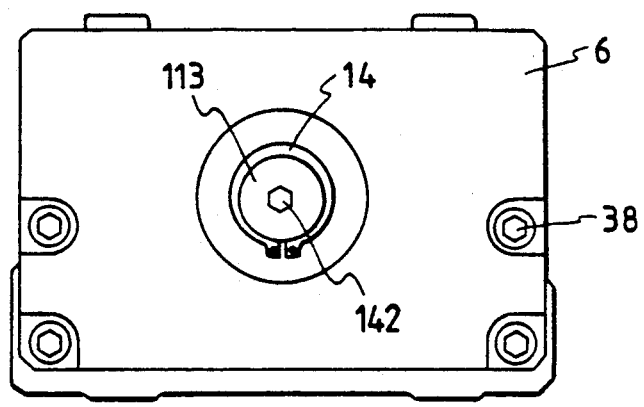
FIG. 20 is a left side view of the construction shown in FIG. 19.
Figure 21:
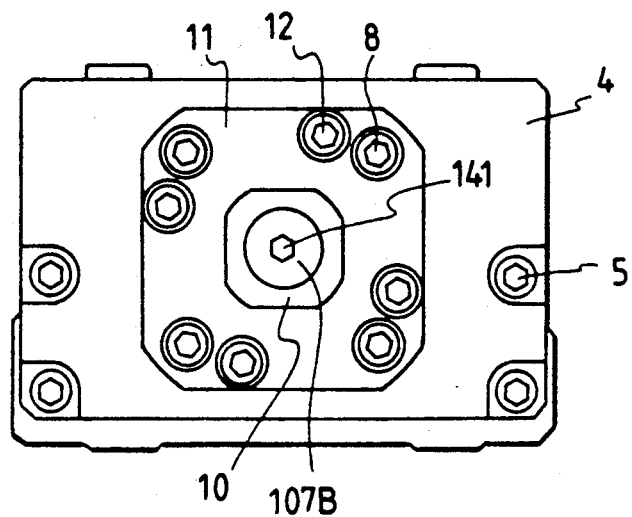
FIG. 21 is a right side view of the construction shown in FIG. 19.
Figure 22:
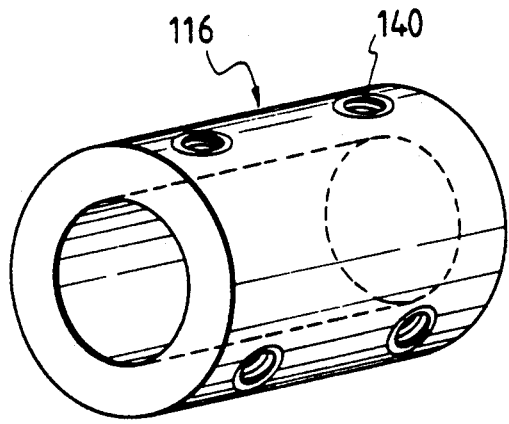
FIG. 22 is a perspective view illustrating the component parts for the construction shown in FIG. 18.

FIG. 16 and FIG. 17 respectively show a modified example in which the spacing seats 46 and 46 are interposed between the guide rail 1 and the shaft supporting plate 4 and tightly held with the bolts 5 (Refer to FIG. 5). Although these spacing seats 46 and 46 are in a shape different from that of the spacing seat 42 illustrated in FIG. 11 cited above, these are two spacing seats formed in such a way that they can be inserted similarly from the side, and these spacing seats 46 and 46 can be installed without removing the lock nut 10, the spacer 41, or the shaft supporting plate 4 from the feed screw 7.

Moreover, it is possible easily to prevent the spacing seat 46 from a deviation or falling off from the shaft supporting plate 4 by either using a magnet or magnetizing the spacing seat 46 itself in the same way as in the case of FIG. 12.

As it is possible to ship the linear working unit with the two nut blocks set precisely in their relative positions in relation to the guide rail 1 in conformity with the user's desires by providing a spacing seat each at the side of the shaft supporting plate and at the side of the feed screw in the manner described above, the user will be able to use the linear working unit in a simple manner only by installing it. In this example of preferred embodiment, a spacing seat is provided to both of the shaft supporting plate side and the screw shaft side, but it is feasible to provide a spacing seat only on either one of these, and also a spacing seat may be formed not in two divided parts but in three divided parts.

Moreover, the example of preferred embodiment given above describes a case in which a ball screw is employed as the feed screw, but a sliding screw may be used instead of the ball screw. Further, this example of preferred embodiment shows a case in which the linear working unit employs a guide rail with a ball rolling groove formed on each of its inner side surfaces, but it is possible to form a construction which employs a guide rail with a ball rolling groove formed on both of its outer side surfaces.

Furthermore, the example of preferred embodiment given above describes a case in which the left-hand thread part and right-hand thread part of the feed screw are made in equal pitch, but it is possible to form a construction in which both of the threaded parts are made in respectively different pitches as required, so that the two nut blocks may perform their leftward and rightward movement, maintaining a desired relative relation between them, and, in addition, it is possible also to form a construction which employs a right-hand thread for the first nut block and a left-hand thread for the second nut block.

Furthermore, this example of preferred embodiment describes a case in which a ball screw of the external circulation type working with a ball circulating tube is used as a ball screw, and yet it will be feasible to employ an internal circulation type ball screw, which circulates the balls by means of pieces or a ball screw which circulates balls through a ball circulating passage formed in the nut blocks by the use of an end cap.

Still further, this example of preferred embodiment shows a case in which the balls are circulated with an end cap fixed at each end of the nut blocks, but the means of circulating the balls is not limited to the end cap as shown here, but any publicly known means of circulating the balls, such as a tube, may be used.

A linear working unit according to the present invention is comprised of a left-hand thread part and a right-hand thread part formed on a single feed screw, with two nut blocks independently set in engagement by screw with this left-hand thread part and this right-hand thread part, respectively, and also provided with rolling elements arranged between a rolling groove formed for the rolling elements in the guide rail and a rolling groove formed for the rolling elements in each of these nut blocks, the nut blocks being enabled to perform their respective sliding motion by the effect of the rolling motion of these rolling elements, and this construction can therefore form a linear working unit which offers the advantageous effect that it can operate with a small motor, that it can also keep the nut blocks in their accurate movement in the mutually opposite directions, i.e., leftward and rightward, by the effect of the rotating motion of the feed screw, and that the user will be able to use the linear working unit in a simple manner only if this linear working unit is installed.

Moreover, the two nut blocks can be driven for their leftward and rightward movement as desired by the control of a single feed screw, with the left-hand thread part and the right-hand thread part provided on the feed screw being set in a prescribed pitch.

A linear working unit according to the present invention is comprised of a single feed screw, with a left-hand thread part and a right-hand thread part formed thereon, with independent nut blocks respectively joined by screw onto this left-hand thread part and the right-hand thread part, and with rolling elements set between a rolling groove formed for the rolling elements on a guide rail and a rolling groove formed for the rolling elements on each of the nut blocks, the nut blocks being set into their respective sliding movement by the effect of the rolling motion of these rolling elements, and, as a spacing seat is interposed between the feed screw side and the shaft supporting plate side in a structure thus formed so as to change the relative position of the feed screw in relation to the guide rail, it is possible to change the position of the feed screw in relation to the guide rail by varying the thickness of the spacing seat, so that this construction achieves the advantageous effect that it can offer a moderately priced linear working unit which, being built with its principal component parts used in common, is capable of adjusting the two nut blocks in respect of any arbitrarily selected size smaller than the pitch of the screw shaft in the linear working unit which operate the two nut blocks so as to move with high accuracy, maintaining their well-regulated relative positions in the mutually opposite directions, namely, leftward and rightward.

In addition, the linear working unit according to the present invention is constructed with a small number of items of component parts and in a light weight, and the present invention can thus offer a compact and inexpensive linear working unit.

Furthermore, the linear working unit according to the present invention is constructed in such a manner that the two nut blocks will move as guided along the same rolling groove formed for the rolling elements in the guide rail, the linear working unit is capable of securing the parallelism of the two nut blocks at the time of their operation and the two nut blocks are free from the occurrence of any deviation of their shaft core.

Second Example of Preferred Embodiment

Now, a second example of preferred embodiment of the present invention will be described in detail with reference to FIG. 18 through FIG. 23 in the accompanying drawings, in which the same reference marks are assigned to those component parts which are used in this example in common with the first example of preferred embodiment, and a description of their operations and functions will be omitted here.

Now, a guide rail 1, which is a rail member in a long length as shown in FIG. 18, is formed in a rectangular cross section with its upper side open (that is, approximately in the U-shape) and has ball rolling grooves 2, each of which is a single rolling groove provided for the movement of rolling elements and extending in the axial direction, and these ball rolling grooves 2 are formed in their mutually confronting arrangement on the inner surfaces of the two side wall parts 1B and 1B extending upward from both ends of the bottom area 1A of the rail member (Refer to FIG. 6). Then, round bolt holes 3 for bolts for use in the installation of the guide rail are formed in the state of being set apart at predetermined intervals in the axial direction in the bottom area 1A in a position in the proximity of the two side wall parts 1B. A shaft supporting plate 4 is mounted as tightened with threaded bolts 5 onto the right end part of this guide rail 1 in the lengthwise direction of this guide rail. A shaft supporting plate 6 is mounted as tightened with threaded bolts 38 on the left end part of the guide rail 1.

A first screw shaft 107, which has a right-hand thread part 107A over almost the entire length on the circumferential surface thereof, is arranged in the longitudinal direction of the guide rail 1, held in parallel with the ball rolling grooves 2 and 2, which are respectively provided on the two side walls 1B and 1B of the guide rail, and arranged in a position intermediate between the two side wall parts 1B and 1B. One end of the first screw shaft 107 is inserted into ball bearing unit (not shown in the drawing), which is set in the housing 9 for a support unit installed by the use of a bolt 8 on the shaft supporting plate 4, and is supported in such a manner as to be prohibited by a lock nut 10 from its movement in the axial direction and to be enabled to turn freely. A clamping cover 11, which is used to fix the outer ring side of the ball bearing unit, is fixed with a bolt 12 on the outer end surface of the housing 9. The second screw shaft 113, which has a left-hand thread part 113A over almost the entire length of the circumferential surface thereof, is arranged in the axial direction, sharing the same shaft core with the first screw shaft 107. The end part Of the first screw shaft which is at the opposite side to the end part thereof axially supported with the support unit and one end part of the second screw shaft positioned opposite to the above-specified end part of the first screw shaft are rigidly connected with each other by a coupling 116 in a position where the phase of the turning direction of the second screw shaft 113 is adjusted to the first screw shaft 107. The fixation of the coupling 116 and the end parts of the screw shafts is attained by tightening a stop screw 139 helically joined with the coupling 116. The other end part of the second screw shaft 113 is inserted into the bearing unit set in the shaft supporting plate 6, and the bearings are prevented from falling off by means of a stop ring 14 set in its engagement with the shaft end, and, in this state, the end parts of the second screw shaft 113 are supported. The right-hand thread part 107A of the first screw shaft and the left-hand thread part 113A of the second screw shaft are almost equal in length. The shaft end 107B of the first screw shaft 107 forms the shaft part on which a rotating joint is to be installed, and this shaft end 107B of the first screw shaft is connected by the rotating joint with a driving motor which turns the first screw shaft 107.

The linear working unit according to the present invention is driven for its operation with a motor driven for its revolutions, with the output shaft of the motor connected by the rotating joint with the shaft end 107B of the first screw shaft.

The side seal 135 is constructed as provided with an annular projection made of rubber material for absorbing the impact which is caused when the first nut block 15 and/or the second nut block 28 collide with the shaft supporting plate 4 and/or with the shaft supporting plate 6 or with the coupling 116, and this projection functions as a cushion.

The first nut block 15 is helically joined with the right-hand thread part 107A of the first screw shaft while the second nut block 28 is helically joined with the left-hand thread part 113A of the second screw shaft, and, accordingly, the first nut block 15 and the second nut block 28 will move in the directions in which they move away from each other when the first screw shaft 107 is turned clockwise. Now, balls 29 are set in the space between the ball rolling groove 17 formed in the nut block and the ball rolling groove 2 formed the guide rail, and, as the nut blocks are supported by the effect of the rolling motion of the balls, the resistance working against the sliding movement of the nut blocks can be reduced to such a low level that linear working unit according to the present invention can be operated with a motor in a small capacity.

Along with the movement of the nut blocks, the balls 29 will move by their rolling motion, and the balls 29 will be circulated thereby in the circulating passage comprised of the curved passage 33 and the return passage 18 respectively formed in the end cap. The balls 19 are set in the space between the threaded parts of the nut blocks and the threaded part of the screw shaft, these together forming a ball screw block, so that the revolution of the screw shaft will set the balls 19 into their rolling movement through the space between the threaded part of the screw shaft and the threaded parts of the nut blocks along with the movement of the nut blocks, and those balls which are pushed out into the ball circulating tube will circulate through the ball circulating tube.

Moreover, when the first screw shaft 107 is turned in the counterclockwise direction, which is in reverse to the direction of the above-mentioned turning operation of the first screw shaft 107, a movement reverse to what is mentioned above will be performed, by which the first nut block 15 and the second nut block 28 will respectively move in the directions in which these nut blocks 15 and 28 approach each other. The linear working unit according to the present invention has the first screw shaft 107 and the second screw shaft 113 rigidly held by means of the coupling 116. This coupling 116 is a hollow cylindrical member, and, in this hollow hole of the coupling 116, the first screw shaft 107 and the second screw shaft 113 are set in such a manner as to be capable of rotating. Screw holes 140 are formed in the outer circumferential surfaces at the two end parts of this coupling, and a stop screw 139 is helically fitted into each of these screw holes, and thus it is possible to fix the two screw shafts in the positions of these two screw shafts as turned by a predetermined amount in relation to the coupling 116. Therefore, the linear working unit can make adjustments of the phase of the second screw shaft 113 in relation to the first screw shaft 107 with respect to any arbitrarily selected size smaller than the pitch of the screw shafts. As the linear working unit is formed in this construction, it is possible to make an adjustment in such a manner that the second nut block 28 is placed in a predetermined position in relation to the first nut block 15 by loosening the stop screw 139 of the coupling and turning the screw shaft, and, then, the first screw shaft 107 and the second screw shaft 113 can be fixed in their adjusted positions by tightening the stop screw 139. In this regard, hexagonal holes 141 and 142 are made in the end parts of the first screw shaft 107 and the end parts of the second screw shaft 113, and, with a hexagonal wrench put into each of these hexagonal holes 141 and 142, it is possible to make an adjustment of the position of the second nut block 28 in an easy way by turning the second screw shaft with the hexagonal wrench set in the hexagonal hole 142 while holding down by hand the hexagonal wrench put into the hexagonal hole 141 so that the first screw shaft is thereby prevented from turning.

The pitch of the right-hand thread part and that of the left-hand thread part of the linear working unit according to the present invention are made equal, and the respective nut blocks are formed in the same dimensions. Therefore, the movements of the respective nut blocks will be different in direction but equal in speed when the first screw shaft is turned, and these nut blocks are equal in weight. These operating features offer the advantage that the vibrations of the nut blocks at the time of their stopping will offset each other, so that it is thereby made possible to finish the positioning of the nut blocks in a short period of time.

The ball rolling groove 2, which is comprised of the ball rolling groove part provided in the guide rail 1 for guiding the first nut block 15 and the ball rolling groove part provided in the guide rail for guiding the second nut block 28, is a groove formed of the same set of work executed over the entire length in the process for forming the groove, and the ball rolling groove 2 is thereby made with high precision in terms of such factors as its vertical orientation and parallelism, and it is therefore free from the occurrence of a deviation of the shaft core in the movement of the respective nut blocks, so that the moving accuracy of the two nut blocks can be secured.

Moreover, the example of preferred embodiment given above describes a case in which a ball screw is employed as the first screw shaft, but a sliding screw may be used instead of the ball screw. Further, this example of preferred embodiment shows a case in which the linear working unit employs a guide rail with a ball rolling groove formed on each of its inner side surfaces, but it is possible to form a construction which employs a guide rail with a ball rolling groove formed on both of its outer side surfaces.

Furthermore, the example of preferred embodiment given above describes a case in which the right-hand thread part 107A of the first screw shaft and the left-hand thread part of the second screw shaft are made in equal pitch, but it is possible to form a construction in which both of the thread parts are made in respectively different pitches, as necessary, and, in addition, it is possible also to form a construction which employs a left-hand thread for the first nut block and a right-hand thread for the second nut block.

Furthermore, this example of preferred embodiment describes a case in which a ball screw of the external circulation type working with a ball circulating tube is used as a ball screw, and yet it will also be feasible to employ an internal circulation type ball screw, which circulates the balls by means of pieces, or a ball screw which circulates balls through a ball circulating passage formed in the nut blocks by the use of an end cap.

Still further, this example of preferred embodiment shows a case in which a cylindrical coupling is used as its coupling but the coupling is not limited to its shape described in this example of preferred embodiment and may be formed in various modified shapes so long as it is capable of properly adjusting the phases of the two screw shafts.

Figure 23:
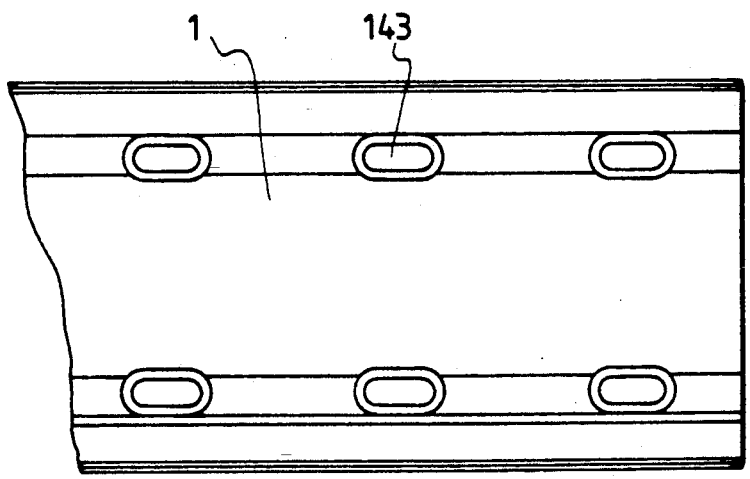
FIG. 23 is a plane view of a modified example of the guide rail in the second example of preferred embodiment shown in FIG. 18.

Still further, this example of preferred embodiment shows a case in which the round bolt holes are made as holes for the installation of the guide rail, but the holes may be oblong holes 143 having their longer side formed in the axial direction as shown in FIG. 23. The use of such oblong holes 143 will offer a linear working unit which permits a simple adjustment of the position of the nut block because such holes make it possible to perform a fine adjustment accurately with reference to the movement of a dial gauge set on the guide rail when the guide rail is to be fixed accurately in the mounting position on the base on which it is to be used.

Furthermore, this example of preferred embodiment shows a case in which the balls are circulated with an end cap fixed on each of the end parts of the nut blocks, but the means of circulating the balls is not limited to the end cap as shown here, but any publicly known means of circulating the balls, such as a tube, may be used.

A linear working unit according to the present invention is comprised of a first screw shaft having a left-hand thread part and a second screw shaft having a right-hand thread part, the first and second screw shafts being fixed by a coupling in the positions as determined by adjustments of the phases of the ball screw grooves on the respective screw shafts, with two nut blocks independently set in engagement by screw with the right-hand thread part of the first screw shaft and the left-hand thread part of the second screw shaft, respectively, and also provided with rolling elements arranged between a rolling groove formed for the rolling elements in the guide rail and a rolling groove formed for the rolling elements in each of these nut blocks, the nut blocks being enabled to perform their respective sliding motion by the effect of the rolling motion of these rolling elements, and this construction is therefore capable of making an adjustment of the relative positions of the two nut blocks, with respect to any size smaller than the pitch of the screw shafts, in the linear working unit which performs accurate operation with these two nut blocks maintaining their relative positional relation as adjusted in the mutually reverse directions. This construction can therefore form a linear working unit which offers the advantageous effect that it can be used in an easy and simple way, owing to the unit construction in which the linear working unit is thus formed.

Moreover, the linear working unit according to the present invention can operate with small resistance to the sliding movement of the nut blocks and can therefore be constructed with a smaller motor, a smaller number of items of component parts, and the present invention can therefore offer a compact and moderately priced linear working unit.

Further, since the two nut blocks in the linear working unit according to the present invention are constructed in such a manner that they move as guided by the same rolling grooves formed in the guide rail for the rolling elements, the construction can maintain the parallelism of the two nut blocks at the time of their operation, and it is therefore not necessary to take any trouble in keeping the shaft cores of the two nut blocks in proper alignment.

Furthermore, the two nut blocks can be driven for their leftward and rightward movement as desired by the control of a single screw shaft, with the right-hand thread part formed on the first screw shaft and the left-hand thread part formed on the second screw shaft being set in a prescribed pitch.

Third Example of Preferred Embodiment

Now, a third example of preferred embodiment of the present invention will be described in detail with reference to FIG. 24 through FIG. 30 in the accompanying drawings, in which the same reference marks are assigned to those component parts which are used in this example of embodiment in common with the second example of preferred embodiment, and a description of those common component parts will be omitted here.

Now, the linear working unit in the third example of preferred embodiment of the present invention has a first screw shaft 107 and a second screw shaft 103 fixed by a coupling 116 provided with a vibration control means.

Figure 26:
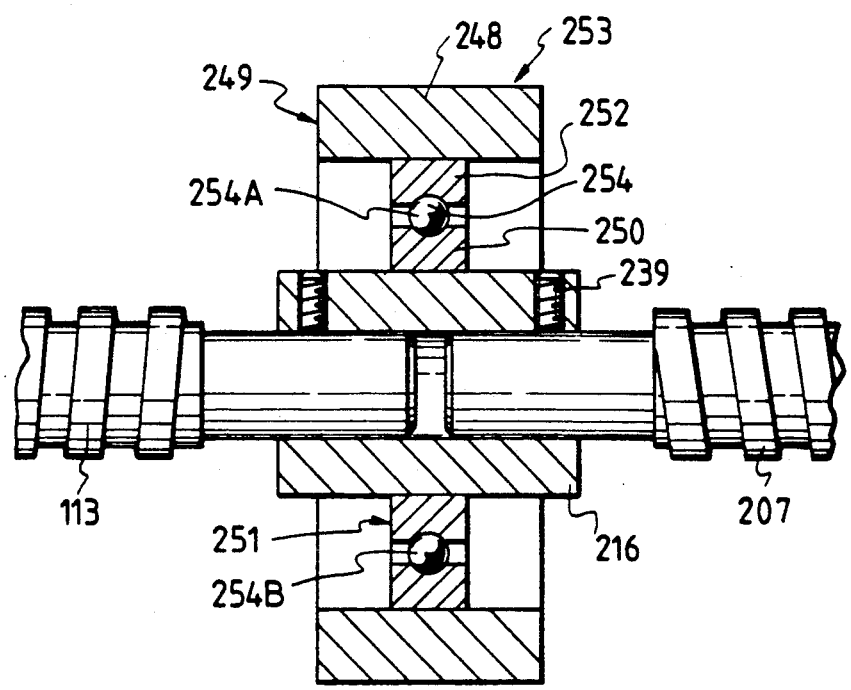
FIG. 26 is a sectional view of a part of the construction shown in FIG. 24.

As shown in FIG. 26, an inertial body 253 is formed by fixing the outer circumferential part of an outer ring 252 for a ball bearing unit 251 by adhesion to an annular member 248, and the inertial body 253 is enabled to perform relative movement, together with a plural number of balls in the ball bearing unit, in relation to the screw shafts 107 and 113, and a vibration control means 249 is formed by fixing the inner circumferential part of the inner ring 250 of the ball bearing unit by adhesion on the outer circumferential part of the coupling 216. The ball bearing unit 251 of this vibration control means has a very small clearance between the inner ring 250 and the ball 254, which is another inertial body, or between the ball 254 and the outer ring 252, and the inertial body 253 or the ball 254 is allowed to move slightly within the confines of the clearance mentioned above. With vibrations at a low rate of acceleration, the inertial body 253 and the ball 254 gives the force of inertia in the direction at right angles with the shaft cores of the screw shafts 107 and 113, in the axial direction, in the turning direction, and so forth, and thus the inertial body 253 can attain a reduction of the vibrations of the screw shafts 107 and 113 without making any relative movement in relation to the coupling 216. With vibrations at a high rate of acceleration, the inertial body 253 receives force by way of a ball 254A or the ball 254B when the screw shaft 107 and the screw shaft 113 are displaced in the direction at right angles with their shaft cores, and the inertial body 253 is displaced in the same direction as that of the displacement of the screw shafts 107 and 113. However, as the vibration period of the screw shafts 107 and 113 is generally different from the vibration period of the inertial body 253, the inertial body 253 will collide with the screw shafts 107 and 113 by way of the ball 254A or the ball 254B, thereby interfering with the vibrations of the screw shafts 107 and 113. When the period of the vibrations applied to these screw shafts 107 and 113 is approximately constant, it will be possible to determine such a mass of the inertial body 253 as will cancel off the vibrations of the screw shafts 107 and 113 and to absorb therewith the vibrations which occur in the direction at right angles with the shaft cores of the screw shafts 108 and 113. In case the screw shafts 107 and 113 vibrate in their axial direction, the inertial body 253 receives force by way of the ball 254, and yet the inertial body 253 will collide with the ball 254, and the vibrations which occur to the screw shafts 107 and 113 in their axial direction are reduced by the same effect as that of the vibrations occurring in the direction at right angles with the core shafts of the screw shafts 107 and 113. Moreover, as the result of a reduction of the vibrations in the manner described above, it is possible to achieve an extremely large reduction of the period of time needed before the nut blocks 15 and 28 are brought to their complete stop. The shape and mass of the annular member 248 can be selected as appropriate on the basis of experimental data obtained in a manner matching the operating conditions of the linear working unit. It is required that the inertial body 253 should be adjusted in such a manner as to have no imbalance in relation to the shaft core, and, in this third example of preferred embodiment, it is easy to make such an adjustment of the imbalance of the inertial body 253 because the inertial body 253 is supported with the ball bearing unit 251. That is to say, a part which is out of balance will always stop when it comes to the lowermost position, in case there is any imbalance at all, and it would be an easy task, therefore, to test the balance of the inertial body 253 by turning it and to remove any imbalanced part of it by cutting it away, if any imbalance is thus found to exist, and thereby to attain a well-balanced state in the inertial body 253.

Figure 27:
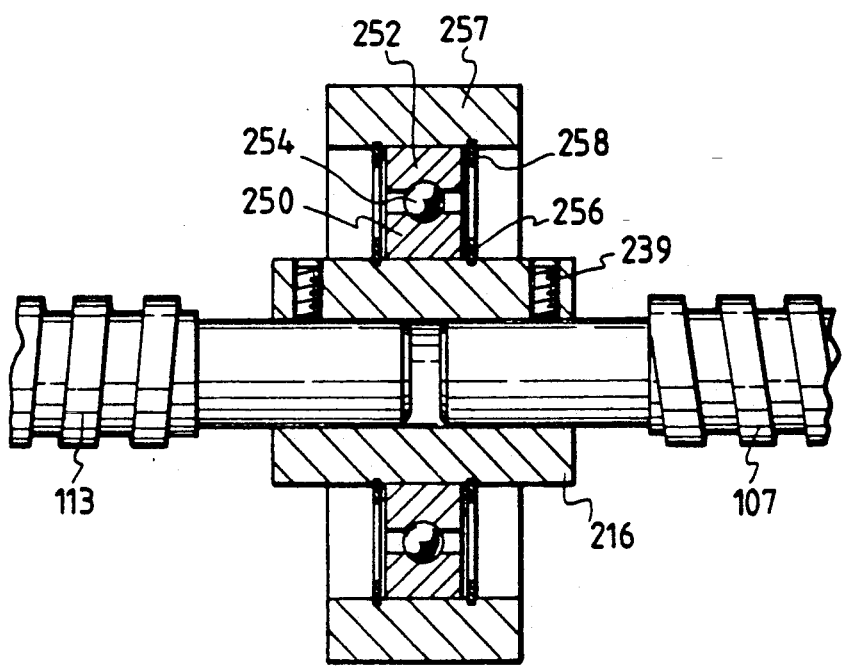
FIG. 27 is a sectional view illustrating a first modified example of the vibration control means forming a part of the third example of preferred embodiment.

In the case of this third example of preferred embodiment, the inner ring 250 of the ball bearing unit is fixed on the coupling 216 while the outer ring 252 is fixed on the annular member 248, but, as shown in the first modified example of the third example of preferred embodiment shown in FIG. 27, it will be feasible to provide a very small clearance between the inner ring of the ball bearing unit and the coupling 216, with both sides of the inner ring 250 being held by the stop ring 256, and also to provide a very small clearance between the outer ring 252 of the ball bearing unit and the inertial body 257, with both sides of the outer ring 252 being held by the stop ring 258. In this case, a very small clearance is provided also in the width of the inner ring 250 and between the stop ring 256 and the stop ring 258. Therefore, as compared with the example of preferred embodiment shown in FIG. 26, in which collisions occur in two locations, which are the space between the inner ring 250 and the ball 254 and the space between the outer ring 252 and the ball 254, collisions occur in four locations in the case shown in this example of preferred embodiment, the collisions including the additional collisions occurring in two other locations, namely, the space between the inner ring 250 and the coupling 216 and the space between the outer ring 252 and the inertial body 257. As the result of the occurrence of the collisions in these four locations, it is made possible to attain a reduction of the vibrations occurring to the screw shafts 107 and 113, which are fixed by the coupling 216, over a wider frequency range than in the case with collisions occurring in the two locations. Now that the natural frequencies of component parts will vary in accordance with their respective masses in such a manner that those component parts having smaller mass have a proportionately high natural frequency while those component parts have a proportionately lower natural frequency according as their mass becomes larger and as the individual component parts respectively exert their force of inertia to the screw shafts, the more significant reduction of the vibrations, which change along with the movement of the nut blocks, a vibration control means will be able to achieve according as the number of the component parts different in their mass increases in it.

Figure 28:
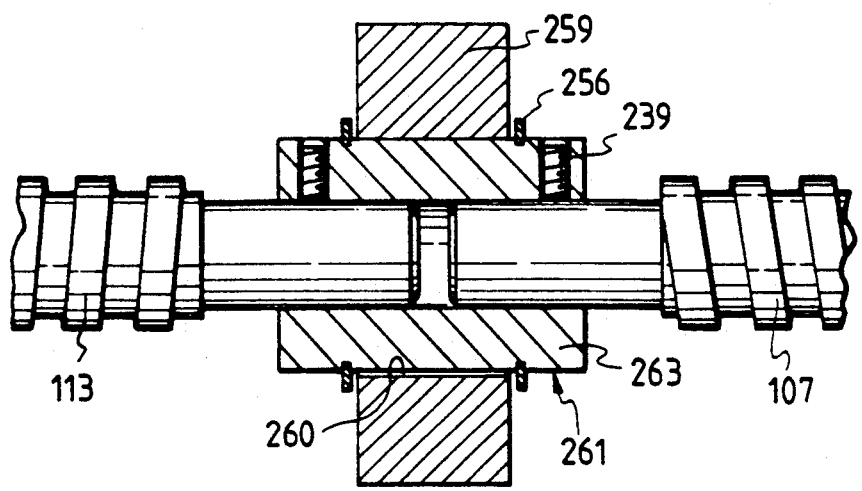
FIG. 28 is a sectional view of a second modified example of a part of the third example of preferred embodiment of the present invention.

In the second modified example of the third example of preferred embodiment, which is shown in FIG. 28, an inertial body 259 is held by a stop ring 256 after a coupling 263 is inserted in an insertion hole 260. The insertion hole 260 is made in such a way that its diameter is very slightly larger than the outside diameter of the coupling 263, and a clearance is formed also between the inertial body 259 in the width direction and the stop ring 256. Thus, the inertial body 259 is formed into a construction formed in such a manner that the inertial body 259 will be able to move by the amount of the clearance in the direction at right angles with the two screw shafts 107 and 113 fixed by the coupling 261 and in the axial direction thereof. Therefore, the construction in this example will be capable of producing a vibration control effect for the same reason as in the third example of preferred embodiment by a collision between the coupling 263 and the inertial body 259 and accordingly capable of achieving a reduction of the vibrations in the direction at right angles with the shaft cores of the screw shafts 107 and 113. This construction is also capable of achieving a vibration control effect by a collision between the inertial body 259 and the stop ring 256, thereby attaining a reduction of the vibrations also in the axial direction of the screw shafts 107 and 113.

Figure 29:
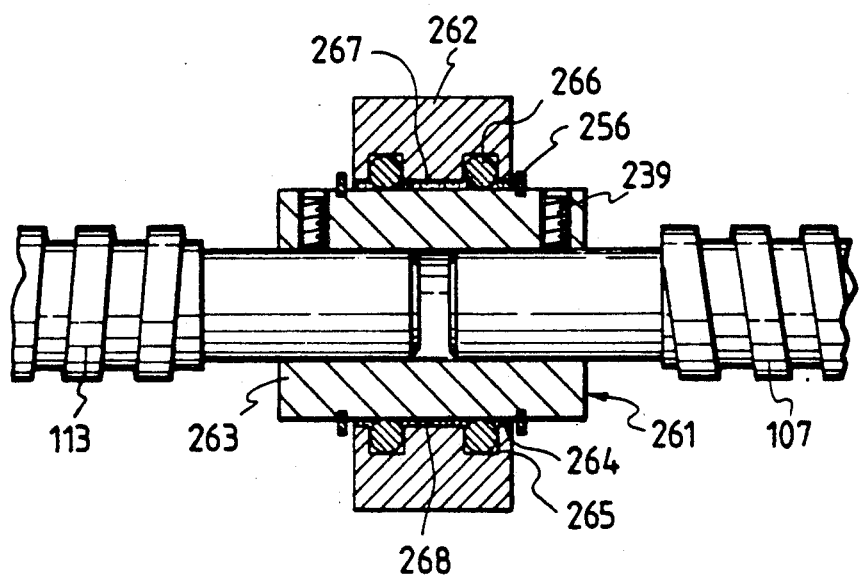
FIG. 29 is a sectional drawing showing a third modified example of a part of the third example of preferred embodiment of the present invention.

In the third modified example of the third example of preferred embodiment shown in FIG. 29, a ring-shaped inertial body 262 is set in an idle state with a clearance left between itself and the coupling 263, and a pair of annular grooves 265 formed at both end parts of the insertion hole 264 made in the inertial body are respectively fitted with an O-ring 266, with the inner circumferential part of this O-ring 266 being held in contact with the outer circumferential part of the coupling 263. A viscous fluid 268 (which may be a silicone oil, for example) is sealed up in the space 267 which is formed with a through hole 264, the outer circumferential part of the coupling 263, and the O-ring 266. The difference of the construction described in this example from the modified example shown in FIG. 28 is that the inertial body 262 will make a relative movement only by the amount of the elastic deformation of the O-ring 266 toward the coupling 263, i.e., in the direction at right angles with the two screw shafts 107 and 113 fixed by the coupling 263 and that the inertial body 262 receives resistance to deformation or resistance to sliding movement by the action of the O-ring when the inertial body 262 is about to move in the axial direction of the screw shafts 107 and 113 or when the inertial body 262 is about to rotate in the direction of rotation of the screw shafts 107 and 113. Consequently, this construction is capable of achieving a reduction of the vibrations in the direction at right angles with the shaft cores of the screw shafts 107 and 113 as the resistance to sliding movement as applied by the O-ring works, in addition to the force of inertia exerted by the guide rail inertial body 262, on the vibrations generated in the direction at right angles with the shaft cores of the screw shafts 107 and 113. Against the vibrations generated in the axial direction of the screw shafts 107 and 113, the inertial body 262 will move in the axial direction, and, at such a time, the viscous resistance produced by the viscous fluid 268 will produce a vibration control effect, in addition to the resistance to deformation or the resistance to sliding movement produced by the O-ring 266 set in the inertial body 262, and this construction will thus be capable of reducing the vibrations occurring in the axial direction. That is to say, the resistance to deformation applied by the O-ring works as a reaction to the vibrations of the screw shafts 107 and 113 elicited by the inertial body 262, and the deformation resistance of the O-ring 266 and the viscous resistance produced by the viscous fluid 268 can absorb the vibration energy of the screw shafts 107 and 113, thereby achieving a reduction of the vibrations in the direction at right angles with the screw shafts 107 and 113. Moreover, against the vibrations occurring in the rotating direction of the screw shafts 107 and 113, the force of inertia of the inertial body 262 produces resistance to sliding movement between the inner circumferential surface of the O-ring 266 and the outer circumferential surface of the coupling 263, and the resistance to sliding movement and the viscous resistance produced by the viscous fluid 268 together absorb the vibration energy at work in the rotating direction of the screw shafts 107 and 113, thereby attaining a reduction of the vibrations occurring in the rotating direction of the screw shafts 107 and 113. In the case described in this example of preferred embodiment, the O-ring 266 is fitted into the inertial body 262, and, as the resistance exerted on sliding movement by the O-ring 266 tends to grow larger when the screw shafts 107 and 113 are rotated, the mass of the inertial body 262 has been reduced to an amount smaller than in the case of the modified example shown in FIG. 28. Furthermore, the inertial body 262 in this example of preferred embodiment is centered by the coupling 263 in relation to the shaft core, so that the clearance between the through hole 264 of the inertial body set in the space 267 and the outer circumferential part of the coupling 263 is kept uniform. Therefore, the viscosity characteristics of the viscous fluid 268 can be obtained in a stable state at all times, so that this construction can attain a stable vibration control effect with the viscous fluid 268.

Figure 30:
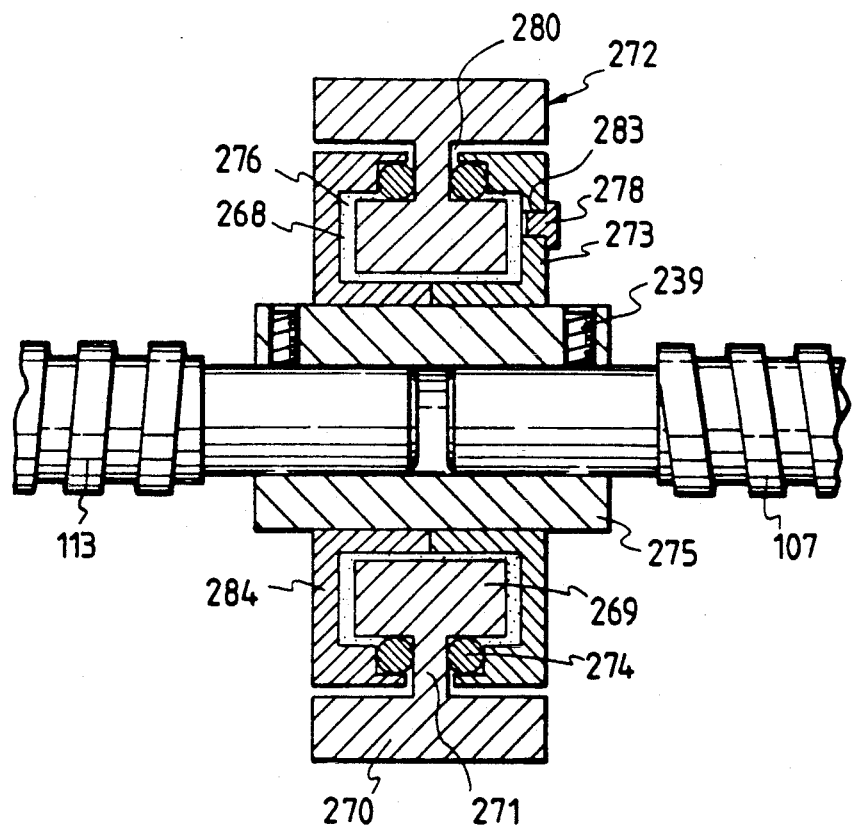
FIG. 30 is a sectional drawing showing a fourth modified example of a part of the third example of preferred embodiment of the present invention.

The fourth modified example of the third example of preferred embodiment shown in FIG. 30 is an example of a vibration control means which is comprised of a ring-shaped inertial body 272, each of which is formed in a section in the I-shape and has a rib part 271 formed between its inner ring part 269 and its outer ring part 270 and between its inner ring part 269 and its outer ring part 270, cases 273 and 284, each of which has a cylindrical tube formed in an approximately U-shaped section in the radial direction, and an O-ring 274. The O-ring 274 is provided in a corner area positioned closer to the inner ring in an annular concave area 280 formed with the outer ring part 270, inner ring part 269, and rib part 271 of the inertial body and fixed by fitting under pressure the case 273 and the case 284 as opposed to each other with their concave areas set inward into a coupling 275. A space part 276 is formed between the inner ring part 269 of the inertial body and the cases 273 and 284, and the space part 276 is hermetically sealed up with a cap 278 after a viscous fluid 268 (for example, silicone oil) is filled into the space part 276 through a viscous fluid feeding port 283. As the vibration control means is formed in this construction, it is capable of producing a vibration control effect, thereby achieving a reduction of vibrations, for the absorption of the vibration energy by the squeeze damper effect produced by the viscous fluid 268 and the deformation resistance produced by the O-ring 274 as elicited by the movement of the inertial body 272 when the vibration control means works against the vibrations occurring in the direction at right angles with the shaft cores of the screw shafts 107 and 113. Moreover, this vibration control means is capable of producing a vibration control effect, thereby achieving a reduction of vibrations, by the deformation resistance produced by the O-ring 274 and the squeeze damper effect of the viscous fluid 268, which are elicited by the movement of the screw shafts 107 and 113 in the axial direction and the force of inertia generated by the inertial body 272, when the vibration control means works against the vibrations of the screw shafts 107 and 113 in the axial direction. This vibration control means is also capable of attaining a vibration control effect, thereby achieving a reduction of vibrations, with the viscosity resistance of the viscous fluid 268 and the sliding movement resistance produced between the O-ring 274 and the cases 273 and 284 or the inertial body 272 when the vibration control means works against the vibrations occurring in the rotating direction of the screw shafts 107 and 113. The fourth modified example of the third embodiment offers the advantage that the vibration control means is capable of achieving reductions of vibrations occurring in various directions, also that the vibration control effect achieved by the vibration control means can be maintained in a constant state because the inertial body 272 is properly centered in the space part 276 by the action of the O-ring, and additionally that the linear working unit according to this invention proves very effective not only in those cases in which it is operated with the screw shafts 107 and 113 kept horizontal, but also in those cases in which the screw shafts 107 and 113 are used in their vertical set-up.

The pitch of the right-hand thread part and the pitch of the left-hand thread part in the linear working unit described in this example of preferred embodiment are made equal, and the nut blocks used for these parts are the same in their dimensions. Therefore, the movements of the respective nut blocks will be reverse in direction and equal in speed when the feed screw is turned, and, as the nut blocks are equal in weight, the vibrations which occur when the nut blocks have stopped are canceled off, so that the linear working unit offers the advantage that it is capable of performing the positioning of the nut blocks in a short period of time.

Moreover, the ball rolling groove 2, which has the ball rolling groove part of the guide rail 1 for guiding the first nut block 15 and the ball guiding groove part of the guide rail for guiding the second nut block 28, is a groove made of the same work set as processed over its entire length for the formation of the groove and is therefore capable of attaining high precision in its real perpendicularity and its parallelism, so that it does not cause any deviation in the shaft core for the movement of the respective nut blocks and can therefore secure high accuracy in the movement of the two nut blocks.

Moreover, the example of preferred embodiment given above describes a case in which a ball screw is employed as the feed screw, but a sliding screw may be used instead of the ball screw. Further, this example of preferred embodiment shows a case in which the linear working unit employs a guide rail with a ball rolling groove formed on each of its inner side surfaces, but it is possible to form a construction which employs a guide rail with a ball rolling groove formed on both of its outer side surfaces.

Furthermore, the example of preferred embodiment given above describes a case in which the right-hand thread part 7A of the first screw shaft and the left-hand thread part 13A of the second screw shaft are made in equal pitch, but it is possible to form a construction in which both of the thread parts are made in respectively different pitches, as required, and, in addition, it is also possible to form a construction which employs a left-hand thread for the first nut block and a right-hand thread for the second nut block.

Furthermore, this example of preferred embodiment describes a case in which a right-hand thread and a left-hand thread are formed on the screw shafts, but, from the viewpoint of the vibration control effect, the thread formation is not to be limited to the combination of a right-hand thread and a left-hand thread.

Figure 31:
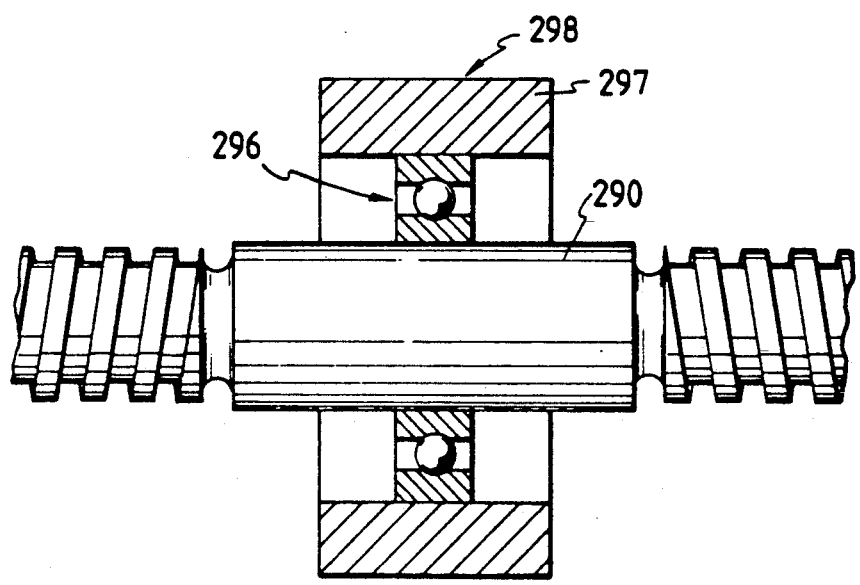
FIG. 31 is a sectional drawing showing a fifth modified example of a part of the third example of preferred embodiment of the present invention.

The third example of preferred embodiment shows a case in which the two screw shafts are fixed with a coupling with a vibration control means formed on the coupling, and yet it is feasible to form a construction of a vibration control means comprised of a ball bearing unit 296, which is fixed directly on a single screw shaft 290, and an annular member 297, which is fixed on the outer ring of the ball bearing unit 296, as shown in FIG. 31. Also, this example of preferred embodiment shows a case in which the vibration control means is provided in the central part of the screw shaft, it is feasible to set the position for the installation of the vibration control means in a location other than the central part of the screw shaft.

Furthermore, this example of preferred embodiment shows a case in which a ball screw of the external circulation type working with a ball circulating tube is used as a ball screw, and yet it will be feasible to employ an internal circulation type ball screw, which circulates the balls by means of pieces or a ball screw which circulates balls through a ball circulating passage formed in the nut blocks by the use of an end cap.

Still further, this example of preferred embodiment shows a case in which the balls are circulated with an end cap fixed at each end of the nut blocks, but the means of circulating the balls is not limited to the end cap as shown here, but any publicly known means of circulating the balls, such as a tube, may also be used.

A linear working unit according to the present invention is comprised of a vibration control means, which, having a member capable of making its relative movement in relation to a screw shaft, is provided on the particular screw shaft, two independent nut blocks respectively joined by screw with the threaded part of the screw shaft, and rolling elements set between a rolling groove formed for the rolling elements on the threaded part of the screw shaft and the rolling groove formed for the rolling elements on each of the nut blocks, the nut blocks being enabled to perform their respective sliding motion in the axial direction by the effect of the rolling motion of these rolling elements. This construction, which is thus provided with a vibration control means having an inertial body capable of making its relative movement in relation to the screw shaft, can therefore form a linear working unit which offers the advantageous effect that it can operate with high accuracy for making adjustments of the relative positions of the two nut blocks with respect to any arbitrarily selected size smaller than the pitch of the screw shaft in a linear working unit in which the two nut blocks operate accurately while maintaining the adjusted relative positional relation, and this construction, which is capable of reducing the noises due to vibrations by controlling the vibrations liable to occur to the screw shaft at the time of the operation of the linear working unit at a high speed or in a long stroke and also capable of reducing the vibrations of the screw shaft, can also offer a linear working unit which can attain an extremely short period of time in which the nut blocks are brought to their complete standstill state. Also, this linear working unit is constructed in the form of an integrated unit, so that it can be used with ease and for readily available convenience.

In addition, the linear working unit according to the present invention operates with small resistance to the sliding movement of the nut blocks and can therefore work with a small motor and can be constructed with a smaller number of items of component parts, and the present invention can therefore offer a compact and moderately priced linear working unit.

Furthermore, the two nut blocks of the linear working unit according to the present invention are designed to work as guided by the same rolling groove formed for the rolling elements on the same guide rail, so that it is possible to secure the parallelism of the two nut blocks at the time of their operation, and it is not necessary to take any trouble for attaining a proper alignment of the shaft cores of the two nut blocks.

What is claimed is:

1. A linear working unit driven by an electric motor, comprising:

a U-shaped linear movement guiding member including an elongated guide rail portion, two mutually confronting side surfaces, and a rolling groove formed, for receiving a plurality of rolling elements in an axial direction, on each of the two mutually confronting side surfaces;

a ball screw shaft member rotatably supported by said linear movement guiding member at both ends thereof, said ball screw shaft member having a left-hand ball screw part and a right-hand ball screw part;

a first screw nut threadedly mounted on said left-hand ball screw part of said ball screw shaft member via balls to move along said ball screw shaft member by rotation thereof, said first screw nut being guided by said guide rail portion via rolling elements in the form of first balls disposed between said first screw nut and said guide rail portion when said first screw nut is moved along said ball screw shaft, said first balls being circulated in a return passage formed in said first screw nut; and a second screw nut threadedly mounted on said right-hand ball screw part of said ball screw shaft member via balls to move along said ball screw shaft member by rotation thereof, said second screw nut being guided by said guide rail portion via rolling elements in the form of second balls disposed between said second screw nut and said guide rail portion when said second screw nut is moved along said ball screw shaft, said second balls being circulated in a return passage formed in said second screw nut.

2. A linear working unit according to claim 1, in which said first screw nut and said second screw nut are moved in mutually reverse direction when said ball screw shaft member is rotated.

3. A linear working unit according to claim 1, in which said ball screw shaft member is a single ball screw shaft which is provided with said right-hand ball screw part formed at the right side thereof and said left-hand ball screw part formed at the left side in an axial direction thereof.

4. A linear working unit according to claim 3, further comprising:

a spacing seat means for adjusting the position of said single ball screw shaft in the axial direction relative to said guide rail.

5. A linear working unit according to claim 1, in which a first ball circulating passage is formed in said first screw nut and a second ball circulating passage is formed in said second screw nut.

6. A linear working unit comprising:
a linear movement guiding member having a guide rail;
a ball screw shaft member rotatably supported by said linear movement guiding member at both ends thereof, said ball screw shaft member having a left-hand ball screw part and a right-hand ball screw part;
a first screw nut threadedly mounted on said left-hand ball screw part of said ball screw shaft member via balls to move along said ball screw shaft member by rotation thereof, said first screw nut being guided by said guide rail via balls disposed between said first screw nut and said guide rail when said first screw nut is moved along said ball screw shaft; and
a second screw nut threadedly mounted on said right-hand ball screw part of said ball screw shaft member via balls to move along said ball screw shaft member by rotation thereof, said second screw nut being guided by said guide rail via balls disposed between said second screw nut and said guide rail when said second screw nut is moved along said ball screw shaft,
wherein said ball screw shaft member is a single ball screw shaft which is provided with said right-hand ball screw part formed at the right side thereof and said left-hand ball screw part formed at the left side in an axial direction thereof;
said linear working unit further comprising:
a spacing seat means for adjusting the position of said single ball screw shaft in the axial direction to said guide rail, in which said linear movement guiding member has a shaft supporting plate for rotatably supporting said ball screw shaft member, said spacing seat means is provided at a position between said shaft supporting plate and a housing which is secured on an end portion of the single ball screw shaft so as to fix said single ball screw shaft to said shaft supporting plate in an axial direction of said shaft.

7. A linear working unit according to claim 6, in which said spacing seat is formed in two divided parts.

8. A linear working unit according to claim 6, in which at least one magnet member is provided between said two divided parts so as to assemble said spacing seat temporarily.

9. A linear working unit comprising:
a linear movement guiding member having a guide rail;
a ball screw shaft member rotatably supported by said linear movement guiding member at both ends thereof, said ball screw shaft member having a left-hand ball screw part and a right-hand ball screw part;
a first screw nut threadedly mounted on said left-hand ball screw part of said ball screw shaft member via balls to move along said ball screw shaft member by rotation thereof, said first screw nut being guided by said guide rail via balls disposed between said first screw nut and said guide rail when said first screw nut is moved along said ball screw shaft; and
a second screw nut threadedly mounted on said right-hand ball screw part of said ball screw shaft member via balls to move along said ball screw shaft member by rotation thereof, said second screw nut being guided by said guide rail via balls disposed between said second screw nut and said guide rail when said second screw nut is moved along said ball screw shaft,
wherein said ball screw shaft member comprises:
a first ball screw shaft having said right-hand ball screw part on the outer periphery thereof;
a second ball screw shaft having said left-hand ball screw part on the outer periphery thereof; and
a coupling means for rigidly coupling said first ball screw shaft and said second ball screw in such a manner that the axis of the first ball screw shaft substantially corresponds with the axis of the second ball screw shaft and the phase of said first ball screw shaft is adjusted relative to that of said second ball screw shaft.

10. A linear working unit according to claim 9, in which said coupling means comprises a cylindrical sleeve having screw holes through which screws are threadedly inserted so as to rigidly couple said first and second shaft with said coupling means.

11. A linear working unit according to claim 8, in which the phase of said first ball screw shaft is adjusted relative to that of said second ball screw shaft in a non-stepped manner.

12. A linear working unit comprising:
a linear movement guiding member having a guide rail;
a ball screw shaft member rotatably supported by said linear movement guiding member at both ends thereof, said ball screw shaft member having a left-hand ball screw part and a right-hand ball screw part;
a first screw nut threadedly mounted on said left-hand ball screw part of said ball screw shaft member via balls to move along said ball screw shaft member by rotation thereof, said first screw nut being guided by said guide rail via balls disposed between said first screw nut and said guide rail when said first screw nut is moved along said ball screw shaft;
a second screw nut threadedly mounted on said right-hand ball screw part of said ball screw shaft member via balls to move along said ball screw shaft member by rotation thereof, said second screw nut being guided by said guide rail via balls disposed between said second screw nut and said guide rail when said second screw nut is moved along said bal screw shaft; and
a vibration control means fixed on said ball screw shaft member for damping a vibration of said ball screw shaft member in a vertical direction and a longitudinal direction when said ball screw shaft member is rotated.

13. A linear working unit according to claim 12, in which said vibration control means comprises:
a bearing unit having a inner race, an outer race, and a rolling member disposed between the inner and outer races, said inner race being fixed on the outer peripheral surface of said ball screw shaft member; and
an inertial body mounted on said outer race of said bearing.

14. A linear working unit according to claim 13, in which said vibration control means further comprises:
- a pair of inner stop rings mounted on the outer peripheral surface of said ball screw shaft member and provided on both sides of said inner race in the axial direction of said bearing in such a manner that a clearances is formed between one of said inner stop rings and said inner race in said axial direction; and
- a pair of outer stop rings mounted on the inner peripheral surface of said inertial body and provided on both sides of said outer race in the axial direction of said bearing in such a manner that a clearance is formed between one of said inner stop rings and said inner race in said axial direction.

15. A linear working unit according to claim 12, in which said vibration control means comprises:
- an inertial body mounted on said ball screw shaft member via a clearance; and
- a pair of stop rings mounted on the outer peripheral surface of said ball screw shaft member and provided on both sides of said inertial body in the axial direction.

16. A linear working unit according to claim 15, in which the inner periphery of said inertial body is larger than the outer periphery of said ball screw shaft member so as to formed a clearance therebetween, said inertial body is formed with a pair of annular grooves at the inner periphery so as to hold a pair of O-rings therein respectively, said O-rings are respectively fitted with the outer periphery of said screw shaft member, and a viscous fluid is sealed in said clearance by said O-rings.

17. A linear working unit according to claim 12, in which said vibration control means comprises:
- an inner inertial body mounted on said outer peripheral surface of said ball screw shaft member; and
- an outer inertial body rotatably engaged with said inner inertial body, wherein a clearance filled with a viscous fluid is formed between said inner inertial body and said outer inertial body.

* * * * *